(12) United States Patent
Tosaki et al.

(10) Patent No.: US 6,907,240 B2
(45) Date of Patent: Jun. 14, 2005

(54) COMMUNICATIONS CONTROL SYSTEM, COMMUNICATIONS CONTROL METHOD, SERVICE CONTROL STATION, AND COMMUNICATIONS CONTROL STATION

(75) Inventors: Takashi Tosaki, Tokyo (JP); Fumiko Kawaguchi, Yokohama (JP); Takeshi Sugiyama, Yokosuka (JP); Akira Kaiyama, Yokohama (JP); Takeshi Kishimoto, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 374 days.

(21) Appl. No.: 10/307,357

(22) Filed: Dec. 2, 2002

(65) Prior Publication Data
US 2003/0129972 A1 Jul. 10, 2003

(30) Foreign Application Priority Data
Dec. 3, 2001 (JP) .................................... P2001-369062

(51) Int. Cl.$^7$ .............................................. H04Q 7/20
(52) U.S. Cl. ...................................................... 455/417
(58) Field of Search ............................. 455/414.1, 417, 455/435.1

(56) References Cited

U.S. PATENT DOCUMENTS

| 5,903,845 A | 5/1999 | Buhrmann et al. |
| 5,933,778 A * | 8/1999 | Buhrmann et al. ......... 455/461 |
| 5,943,399 A | 8/1999 | Bannister et al. |
| 2003/0050049 A1 * | 3/2003 | Sundstrom ................... 455/414 |
| 2004/0203766 A1 * | 10/2004 | Jenniges et al. ......... 455/435.1 |

FOREIGN PATENT DOCUMENTS

WO    WO 00/18166    3/2000

* cited by examiner

Primary Examiner—Creighton Smith
(74) Attorney, Agent, or Firm—Oblon, Spivak, McClelland, Maier & Neustadt, P.C.

(57) ABSTRACT

A communications control system controls communications conducted between a first communications apparatus for transmitting data and a second communications apparatus for receiving the data. The system includes a store for storing a plurality of communications methods specified by a second user as a user of the second communications apparatus in association with presence information showing the current status of the second user; a selector for selecting a given communications method desired by a first user as a user of the first communications apparatus from among the plurality of communications methods associated with the presence information; and a communications method executor for executing the given communications method for communications between the first communications apparatus and the second communications apparatus, according to a notification that execution is possible for the given communications method selected by the selector.

24 Claims, 13 Drawing Sheets

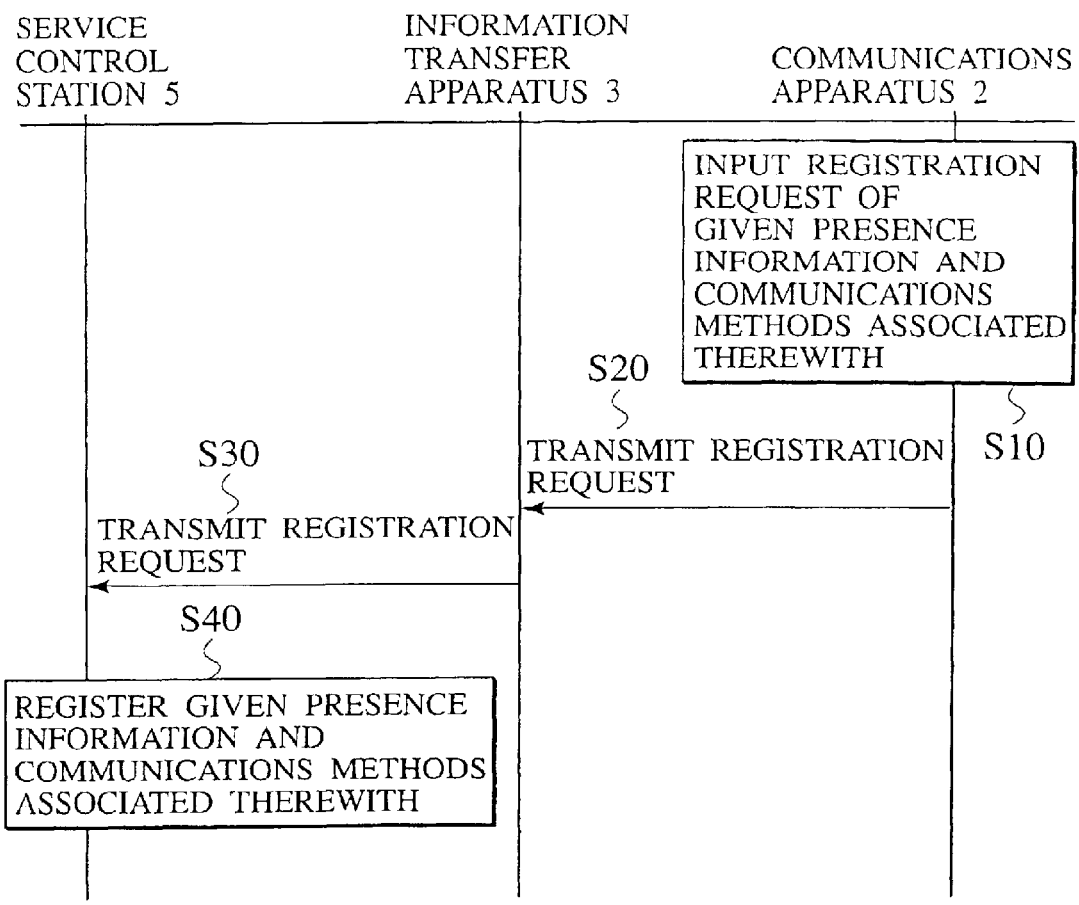

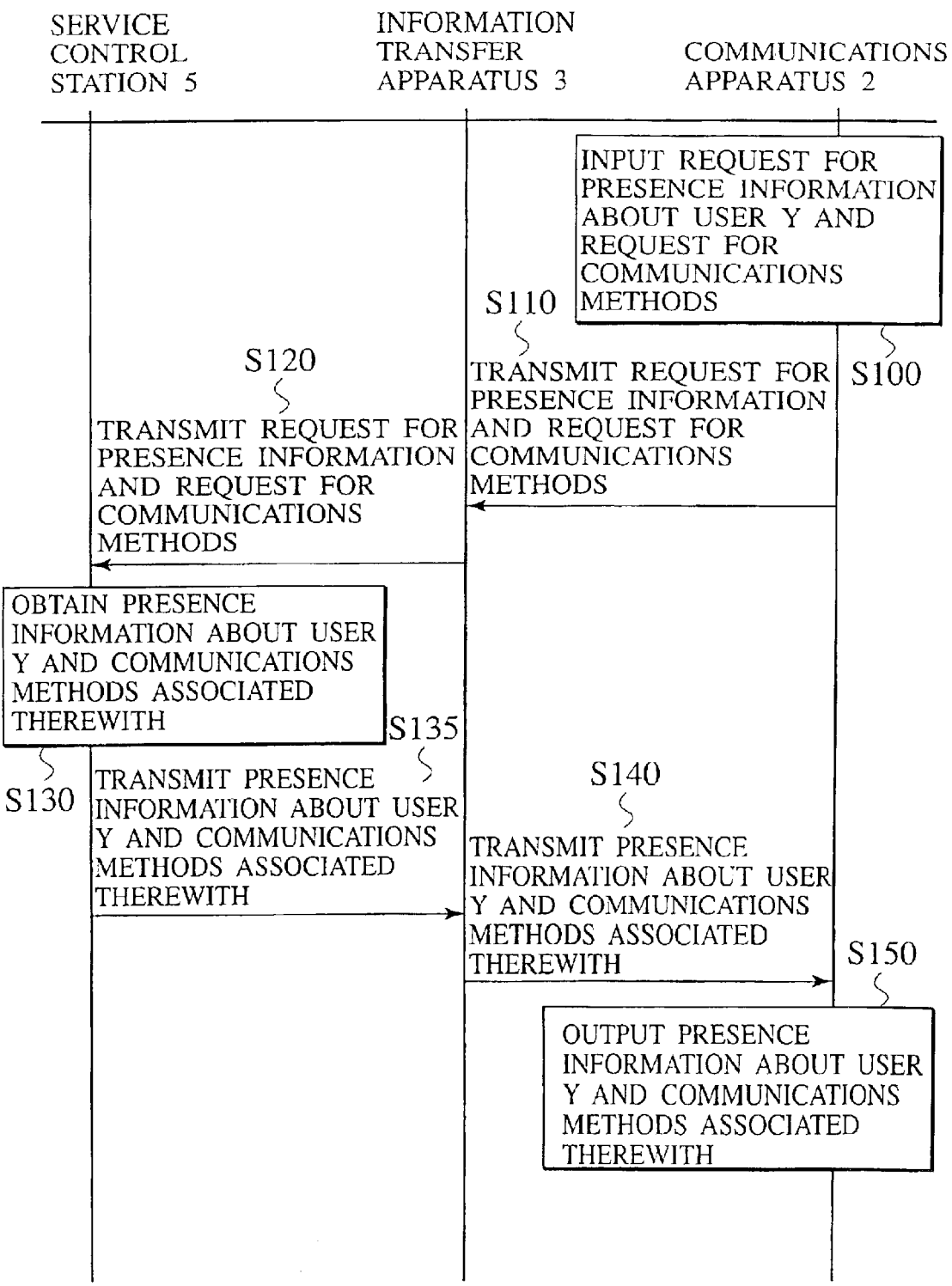

FIG. 10A

| USER | PRESENCE INFORMATION | PLACE INFORMATION | COMMUNICATIONS METHODS | INFORMATION NECESSARY COMMUNICATIONS |
|---|---|---|---|---|
| Y | IN MEETING | IN CLIENT'S OFFICE | COMMUNICATIONS METHOD IN ANSWER MODE | — |
| | | | ELECTRONIC MAIL COMMUNICATIONS METHOD | MAIL ADDRESS |

FIG. 10B

| USER | PRESENCE INFORMATION | PLACE INFORMATION | COMMUNICATIONS METHODS | INFORMATION NECESSARY COMMUNICATIONS |
|---|---|---|---|---|
| Y | IN MEETING | IN THE OFFICE | COMMUNICATIONS METHOD BY TRANSFER | TELEPHONE NUMBER○○ |
| | | | COMMUNICATIONS METHOD IN ANSWER MODE | — |
| | | | ELECTRONIC MAIL COMMUNICATIONS METHOD | MAIL ADDRESS□ |

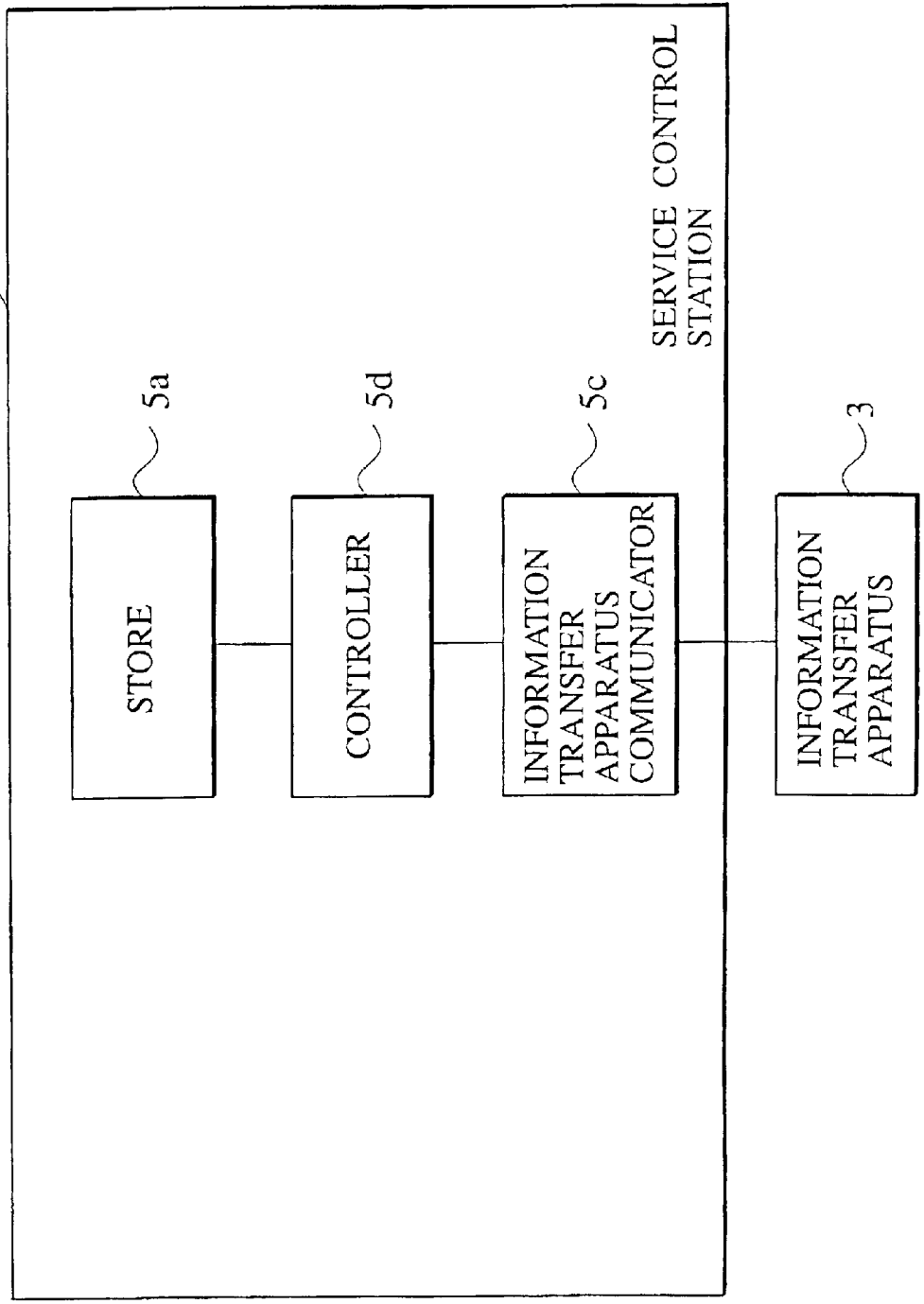

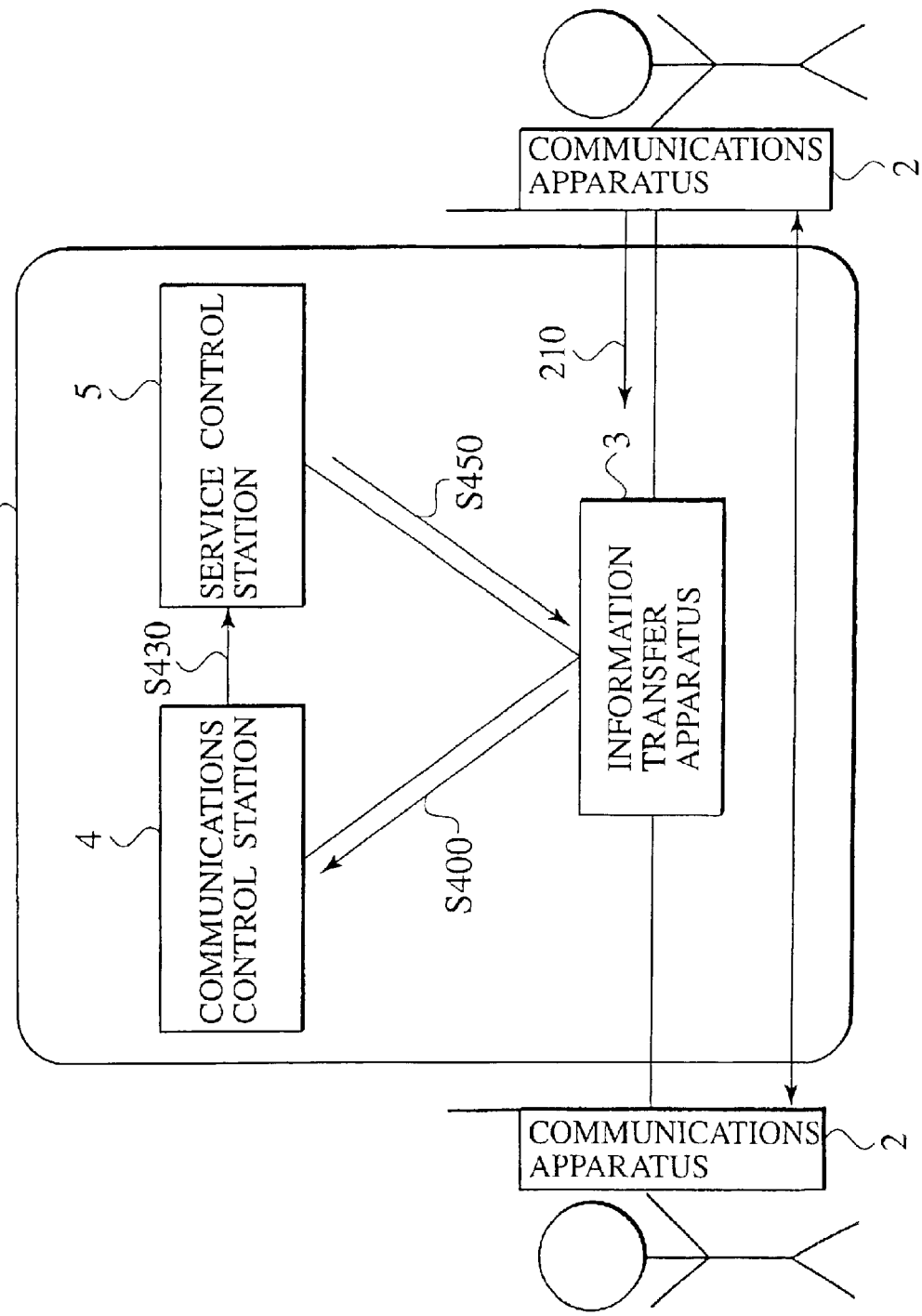

COMMUNICATIONS CONTROL SYSTEM, COMMUNICATIONS CONTROL METHOD, SERVICE CONTROL STATION, AND COMMUNICATIONS CONTROL STATION

CROSS REFERENCE TO RELATED APPLICATION

This application is based upon and claims the benefit of priority from the prior Japanese Patent Application No. P2001-369062, filed on Dec. 3, 2001; the entire contents of which are incorporated herein by reference.

BACKGROUND OF THE INVENTION

1. Field of the Invention

The present invention relates to a communications control system, a communications control method, a service control station and a communications control station for controlling communications conducted between a first communications apparatus for transmitting data and a second communications apparatus for receiving the data.

2. Description of the Related Art

Communications systems represented by mobile communications networks and PHS networks generally have an advantage in their capability to provide users with information at any time. Transmission of information from a first user to a second user is usually performed as described below. The first user transmits data from communications apparatus. The data is received by the communications apparatus of second user. The second user can know the contents of the data through his communications apparatus. In this description, the first user is hereinafter referred to as a transmitting end user and the communications apparatus of the first user is referred to as a "first communications apparatus". Also in the description, the second user is referred to as a "receiving end user" and the communications apparatus of the second user is referred to as a "second communications apparatus".

In order for the transmitting end user to know the actual status of the receiving end user (e.g., in meeting or away from the office), the first communications apparatus of the transmitting end user is required to carry out communications with the second communications apparatus of the receiving end user.

Until the communications are conducted, the transmitting end user cannot thus know the status of the receiving end user. The communication from the first communications apparatus to the second communications apparatus may be undesirable to the receiving end user.

In this context, a presence service has been conventionally provided in computer networks including information processing devices (e.g., personal computers). In a communications system using the presence service, a terminal device of a user provides presence information about the user to a terminal device of another user. The presence information shows the current status of the user. Specifically, the presence information includes information showing that the user is currently in meeting and information showing that the user is at lunch. The presence service is currently provided in communications systems using the Internet.

The use of such presence information allows the "transmitting end user" to know the current status of the "receiving end user". Communications allowing for the current status of the "receiving end user" are thus conducted between the first communications apparatus of the "transmitting end user" and the second communications apparatus of the "receiving end user".

The conventional communication systems, however, have problems as described below. A communications method supposed by the "transmitting end user" to allow for the current status of the "receiving end user" can be inconvenient for the "receiving end user". In this case, the "receiving end user" may want to specify the method of communications between the communications apparatus of the "transmitting end user" and the communications apparatus of the "receiving end user" in accordance with his (the receiving end users) current status.

In the conventional communications system, however, the "receiving end user" cannot specify the communications method at will based on his current status (presence information). Conventionally, the "receiving end user" can specify only information with no relation to his current status (specify a telephone answering service, for example).

Further, the development of a communications system in which a "transmitting end user" can, upon obtaining a plurality of communications methods desired by a "receiving end user", select a communications method that is convenient for the "transmitting end user" from among the plurality of communications methods, is desired. This communications system is convenient for the "transmitting end user". A method of implementing the presence service using mobile communications in 3GPP (http://www.3gpp.org/) and/or in IETF (http://www.ietf.org/), is currently being discussed. However, a method of controlling communications according to presence information has not yet been developed.

Development of a system in which a "receiving end user" can specify a communications methods convenient for the "receiving end user" and a "transmitting end user" can select a given communications method from among the communications methods has thus conventionally been desired. The development of a system in which the given communications method can be implemented between a first communications apparatus of the "transmitting end user" and a second communications apparatus of the "receiving end user" has also been desired.

In summary, the development of a system in which a communications method taking account of conveniences for a "receiving end user" and a "transmitting end user" can be implemented between a first communications apparatus of the "transmitting end user" and a second communications apparatus of the "receiving end user" has conventionally been desired.

BRIEF SUMMARY OF THE INVENTION

It is an object of the present invention to implement a communications method taking account of conveniences for a "receiving end user" and a "transmitting end user" between a first communications apparatus of the "transmitting end user" and a second communications apparatus of the "receiving end user".

A communications control system of the present invention controls communications conducted between a first communications apparatus for transmitting data and a second communications apparatus for receiving the data. The communications control system comprises: a storage for storing a plurality of communications methods specified by a second user which is a user of the second communications apparatus in association with presence information showing the current status of the second user; a selector provided at the first communications apparatus for selecting a given communications method desired by a first user which is a user of the first communications apparatus from among the plurality of communications methods associated with the presence information; and a communications method executor for executing the given communications method for communications between the first communications apparatus and the second communications apparatus, according to a notification that execution is possible for the given communications method selected by the selector.

BRIEF DESCRIPTION OF THE SEVERAL VIEWS OF THE DRAWINGS

FIG. 6 is a sequence diagram illustrating the process of registering presence information and communications methods associated therewith in the embodiment 1;

FIG. 7 is a diagram illustrating an example of the configuration of a communications method table in the embodiment 1;

FIG. 8 is a sequence diagram illustrating the process of providing presence information and communications methods associated therewith in the embodiment 1;

FIGS. 10A and 10B are diagrams illustrating examples of the configuration of a communications method table in a second modification of the embodiment 1;

FIG. 11 is a diagram illustrating the configuration of a service control station in embodiment 2;

FIG. 17 is a complementary diagram illustrating the process of implementing the given communications method associated with the presence information in the embodiment 3.

DETAILED DESCRIPTION OF THE INVENTION

Figure 1:
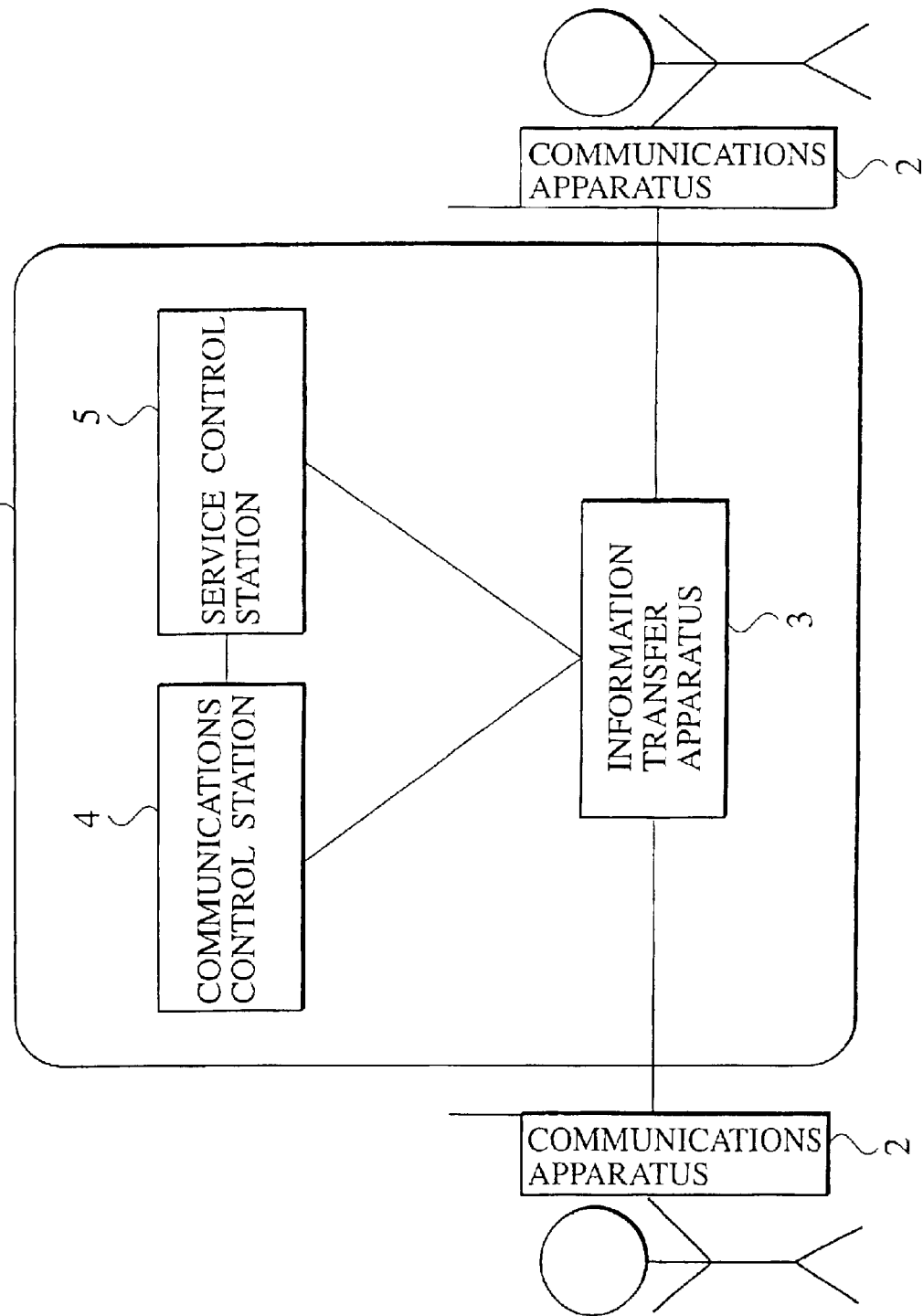
FIG. 1 is a diagram illustrating the configuration of a communications control system in embodiment 1.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally, it will be appreciated that the various drawings are not drawn to scale from one figure to another nor inside a given figure for facilitating the reading of the drawings.

In the following descriptions, numerous specific details are set forth to provide a through understanding of the present invention. However, it will be obvious to those skilled in the art that the present invention may be practiced without such specific details.

Embodiment 1

(The Configuration of a Communications Control System)

FIG. 1 is a diagram illustrating the configuration of a communications control system in embodiment 1. The communications control system in the embodiment 1 includes communications apparatuses 2 used by users of a communications network 1, an information transfer apparatus 3 arranged on the communications network 1, at least one communications control station 4 and a service control station 5. In the communications network 1, wired communications or wireless communications are performed, for example. The communications network 1 is, for example, a packet telecommunications network, a circuit switched network, a PDC network or a W-CDMA network. Alternatively, the communications network 1 may be, for example, a mobile communications network, a PHS communications network or a communications network over the Internet. Signals transmitted and received between the devices within the communications network 1 include packet data signals as well as telephone signals.

Figure 2:
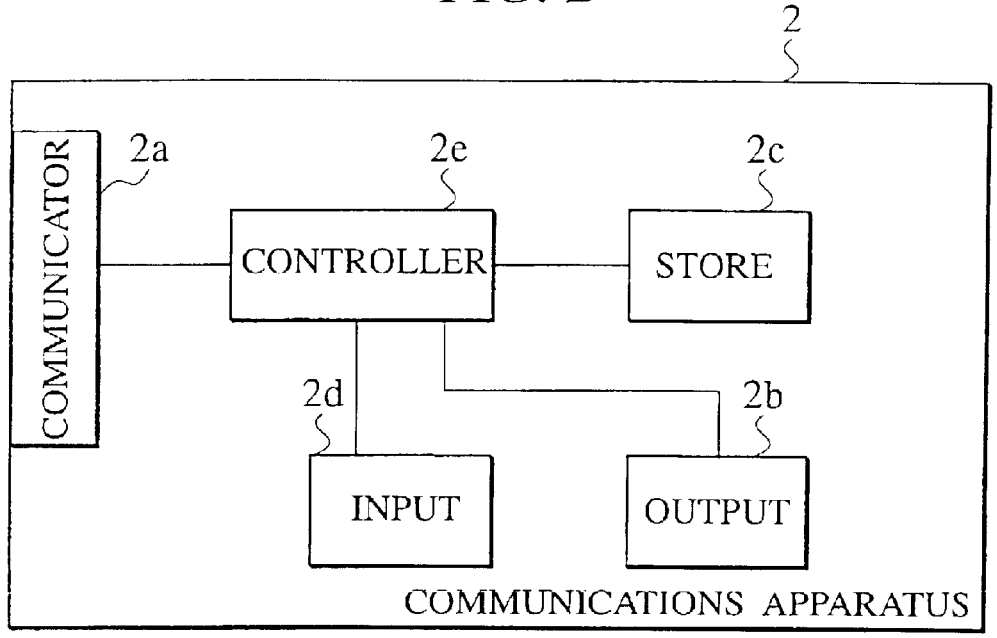
FIG. 2 is a diagram illustrating the configuration of a communications apparatus in the embodiment 1.

The communications apparatus 2 is, for example, a communications terminal device such as a PC, a portable remote terminal or a mobile telephone. FIG. 2 is a diagram illustrating the configuration of the communications apparatus 2. The communications apparatus 2 includes a communicator $2a$ for conducting various data communications with the information transfer apparatus 3, an output $2b$ for outputting various types of data, a store $2c$ for storing various types of data, an input $2d$ with which a user inputs various types of information, and a controller $2e$ for controlling these units. The output $2b$ outputs various types of voice data or displays various types of image data.

Through the input $2d$, the user inputs presence information showing the current status of the user. Through the input $2d$, the user also inputs a plurality of communications methods associated with the presence information. Through the input $2d$, the user also inputs a "request that the plurality of communications methods be stored in the service control station 5." Through the input $2d$, the user also inputs a "request that presence information about a given user be provided." Through the input $2d$, the user also inputs a "request that communications methods associated with presence information about a given user be provided." The "request that presence information be provided" is hereinafter referred to as a "request for presence information." The "request that communications methods associated with presence information be provided" is referred to as a "request for communications methods associated with presence information."

Through the input $2d$, the user inputs a selected given communications method from among the plurality of communications methods associated with the presence information outputted by the output $2b$. The selected given communications method inputted through the input $2d$ is transmitted to the controller 2e. The given communications method is a communications method desired by the user.

Based on the selection, the controller 2e selects the given communications method desired by the user from among the plurality of communications methods associated with the presence information. The store 2c stores location information of the information transfer apparatus 3. The location information is, for example, address information (e.g. a mail address, an IP address) or a telephone number.

Figure 3:
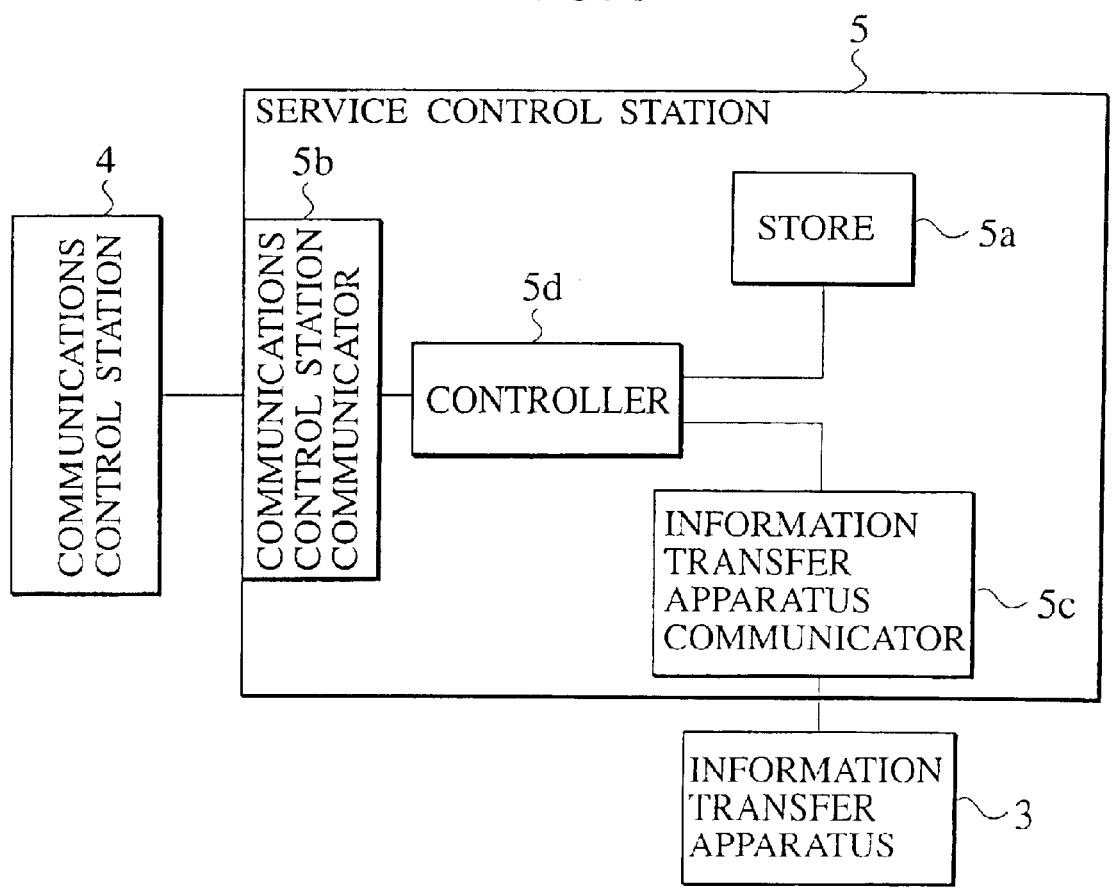
FIG. 3 is a diagram illustrating the configuration of a service control station in the embodiment 1.

FIG. 3 is a diagram illustrating the configuration of the service control station 5. The service control station 5 includes a store 5a for storing various types of data, a communications control station communicator 5b (hereinafter referred to merely as a communicator 5b) for conducting data communications with the communications control station 4, an information transfer apparatus communicator 5c (hereinafter referred to merely as a communicator 5c) for conducting communications with the information transfer apparatus 3, and a controller 5d for controlling these units.

The store 5a stores presence information showing the current statuses of user. The store 5a also stores the communications method specified by each user in association with the presence information about the user. The store 5a also stores location information (e.g., telephone numbers and mail addresses) of the communications apparatuses 2 of the users in the communications network 1. The location information is associated with identification information (e.g., IDs) of the users. The store 5a also stores location information of the communications control station 4.

When the communicator 5c receives a "request that a plurality of communications methods associated with presence information be stored in the service control station 5" and the plurality of communications methods, the controller 5d performs the following process. Based on the request, the controller 5d directs the store 5a to store the plurality of communications methods associated with the presence information.

The communicator 5c transmits a plurality of communications methods associated with given presence information (presence information about a "receiving end user") to the communications apparatus 2 (communications apparatus 2 of the "transmitting end user"). For example, when receiving a request for the communications methods associated with the presence information from the communications apparatus 2 (communications apparatus 2 of the "transmitting end user"), the communicator 5c transmits the request to the controller 5d. The controller 5d retrieves the plurality of communications methods associated with the presence information from the store 5a for transmission to the communicator 5c. The communicator 5c transmits the plurality of communications methods associated with the presence information to the communications apparatus 2.

When receiving a request to generate a notification that execution is possible for a given communications method desired by the "transmitting end user", the communicator 5c transmits the request to the controller 5d. Based on an instruction from the controller 5d, the communicator 5c transmits the generation request for the executable instruction to the communications control station 4 which generates the executable instruction.

Figure 4:
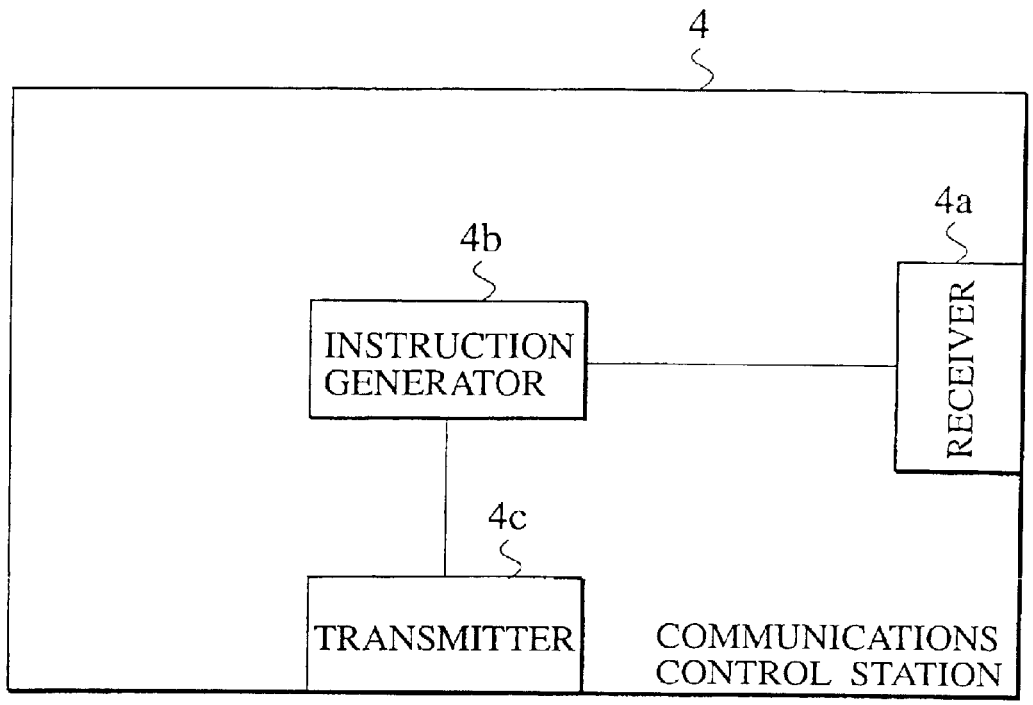
FIG. 4 is a diagram illustrating the configuration of a communications control station in the embodiment 1.

FIG. 4 is a diagram illustrating the configuration of the communications control station 4. The communications control station 4 includes a receiver 4a for receiving a generation request for a notification that execution is possible transmitted from the service control station 5, an instruction generator 4b for generating the executable instruction based on the generation request and a transmitter 4c for transmitting the executable instruction generated by the instruction generator 4b to the information transfer apparatus 3.

To the instruction generator 4b, the location information of the first communications apparatus 2 of the "transmitting end user", the location information of the second communications apparatus 2 of the "receiving end user", information specifying the communications method and other information required to implement the above communications method are transmitted. The instruction generator 4b generates a notification that execution is possible based on the information.

The communications method performed between the first communications apparatus 2 of the "transmitting end user" and the second communications apparatus 2 of the "receiving end user" is, for example, as described below. As an example of the communications method, there is a communications method in which "the information transfer apparatus 3 transfers to a proxy's communications apparatus 2 data transmitted from the first communications apparatus 2 to the second communications apparatus" (this communications method is hereinafter referred to as a "communications method by transfer"). As another example of the communications method, there is a communications method as described below. In the communications method, the information transfer apparatus 3 obtains a call signal transmitted from the first communications apparatus 2 to the second communications apparatus 2. Then, the information transfer apparatus 3 obtains a given message from the second communications apparatus set in answer mode. Then, the information transfer apparatus 3 transmits the given message to the first communications apparatus 2. The communications method is hereinafter referred to as a "communications method in answer mode". As still another example of the communications method, there is a communications method in which "the information transfer apparatus 3 transmits to the second communications apparatus 2, only electronic mail data from among data transmitted from the first communications apparatus 2 to the second communications apparatus 2" (this communications method is hereinafter referred to as an "electronic mail communications method"). As still another example of the communications method, there is also a communications method using visual telephones. The instruction generator 4b generates executable instructions for the respective communications methods. The executable instructions for the respective communications methods are different from one another.

The communications control station 4 may be provided with a store (not shown) for storing executable instructions generated by the instruction generator 4b. This eliminates the need for the instruction generators 4b to generate the same executable instruction redundantly. The communications control station 4 may be provided with an instruction obtainer (not shown) instead of the instruction generator 4b. The store thus stores a plurality of executable instructions. The instruction obtainer may obtain executable instructions from the store. This embodiment will be described with the instruction generator 4b generating executable instructions.

The information transfer apparatus 3 is, for example, a base station or an exchange. The information transfer apparatus 3 transmits data transmitted from the first communications apparatus 2 to the second communications apparatus 2, or transmits data transmitted from the second communications apparatus to the first communications apparatus 2. The information transfer apparatus 3 controls communications conducted between the first communications apparatus 2 of the "transmitting end user" and the second communications apparatus 2 of the "receiving end user". The information transfer apparatus 3 is connected to the service control station 5 and the communications control station 4 through the communications network 1.

Figure 5:
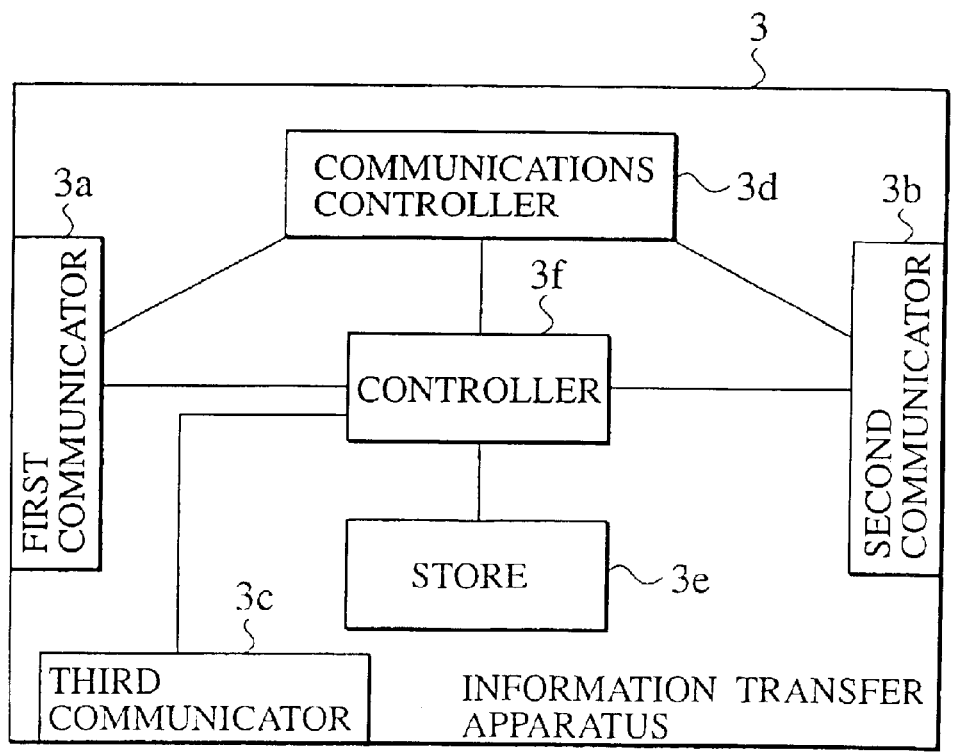
FIG. 5 is a diagram illustrating the configuration of an information transfer apparatus in the embodiment 1.

FIG. 5 is a diagram illustrating the configuration of the information transfer apparatus 3. The information transfer apparatus 3 includes a first communicator 3a for conducting data communications with the communications apparatus 2 of a first user (e.g., a "transmitting end user"), a second communicator 3b for conducting data communications with the communications apparatus 2 of a second user (e.g., a "receiving end user"), a third communicator 3c for conducting several types of data communications with the communication control station 4 and the service control station 5, a store 3e for storing various types of data and a controller 3f for controlling these units. The store 3e stores location information of the communication control station 4 and location information of the service control station 5.

The information transfer apparatus 3 includes a communications controller 3d. The communications controller 3d controls the first communicator 3a, the second communicator 3b and the controller 3f, according to a notification that execution is possible for the given communications method transmitted from the communications control station 4. In this case, the communications controller 3d controls the first communicator 3a, the second communicator 3b and the controller 3f, such that the given communications method is implemented in communications between the first communications apparatus 2 and the second communications apparatus 2. The given communications method is a communications method selected by the controller 2e of the first communications apparatus 2.

Specific description with the given communications method as the "communications method by transfer," for example, will be given below.

To the communications controller 3d, a notification that execution is possible for the given communications method is transmitted. The communications controller 3d decodes the executable instruction. The communications controller 3d obtains the location information of the first communications apparatus 2, the location information of the second communications apparatus 2, the location information of a proxy's communications apparatus 2 and transfer instruction information. The transfer instruction information will be described later.

The communications controller 3d finds data transmitted from the first communications apparatus 2 to the second communications apparatus 2 from among data transmitted to the first communicator 3a, based on the location information of the first communications apparatus 2 and the location information of the second communications apparatus 2. Based on the location information of the proxy's communications apparatus 2 and the transfer instruction information, the communications controller 3d controls the first communicator 3a or the second communicator 3b such that "the data is transferred to the proxy's communications apparatus 2."

(Processes Using the Communications Control System)

Processes of the communications control system having the above-described configuration will be described below.

1) A process in which a user registers in the service control station 5 presence information and communications methods associated with the presence information FIG. 6 is a sequence diagram illustrating the registration by the user of presence information and communications methods associated therewith in the service control station 5, using the communications control system having the above configuration.

In step S10, the user inputs, using the input 2d of the communications apparatus 2, a request that "presence information and a plurality of communications methods associated with the presence information be stored in the service control station 5." The request is hereinafter referred to as a "registration request".

At this time, the user inputs, using the input 2d of the communications apparatus 2, the presence information showing his current status, the user's identification information, information specifying the plurality of communications methods and information related to the communications methods, in association with the registration request.

The information specifying the communications methods includes, for example, information specifying the "communications method by transfer" and information specifying the "communications method in answer mode." The information related to the communications methods is information (e.g., identification information of the proxy) required to implement the "communications method by transfer". The user may input information specifying a single communications method instead of information specifying a plurality of communications methods, using the input 2d.

In step S20, the information including the registration request inputted by the user is transferred to the controller 2e of the communications apparatus 2. The controller 2e obtains the location information of the information transfer apparatus 3 from the store 2c. Based on the location information of the information transfer apparatus 3, the controller 2e transmits the information including the registration request to the controller 3f of the information transfer apparatus 3 via the communicator 2a. At this time, to the controller 3f of the information transfer apparatus 3, the location information of the user's communications apparatus 2 and the location information of the service control station 5 are also transmitted.

The user may input the location information of the information transfer apparatus 3 using the input 2d. Based on the location information, the controller 2e may transmit the information including the registration request to the controller 3f of the information transfer apparatus 3 via the communicator 2a.

In step S30, the controller 3f of the information transfer apparatus 3 holds the location information of the user's communications apparatus 2 and the location information of the service control station 5. Then the controller 3f transmits the information including the registration request via the third communicator 3c to the controller 5d of the service control station 5. At this time, the location information of the user's communications apparatus 2 is also transmitted to the controller 5d of the service control station 5.

In step S40, the controller 5d of the service control station 5 accesses the store 5a based on the registration request. The controller 5d obtains the location information of the communications apparatus 2 associated with the identification information of the proxy as information necessary communications. In step S10, the user may input the location information of the proxy's communications apparatus 2 using the input 2d.

The controller 5d generates a "communications method table" in which the user's identification information, presence information, the plurality of communications methods associated with the presence information, and the information necessary communications are associated with one another. The controller 5d directs the store 5a to store the generated communications method table. FIG. 7 is a diagram exemplifying the communications method table. The information necessary communications is information required to implement the communications methods. When the communications method is the "communications method by transfer," for example, the information necessary communications is the location information of a transfer-destination apparatus (e.g., the proxy's communications apparatus 2). In the communications method table, the information necessary communications is associated with the communications methods.

The "implementation of the registration request of the user" is transmitted via the information transfer apparatus 3 to the controller 2e of the communications apparatus 2. The controller 2e of the communications apparatus 2 directs the output 2b to output the "implementation of the user's registration request."

When the user's current status changes (from in meeting to at lunch, for example), the process steps S10 to S30 are performed again. Based on information including a registration request transmitted, the controller 5d rewrites the contents of the communications method table associated with the user's identification information.

In the communications method table shown in FIG. 7, for example, the presence information is changed from "now in meeting" to "now at lunch." At this time, in the communications method table, the communications methods are changed from the "communications method by transfer," "electronic mail communications method" and "communications method in answer mode" to the "communications method in answer mode" and "communications method by transfer." In the communications method table shown in FIG. 7, the information necessary communications is changed from "telephone number XX, mail address ∆∆" to "telephone number XX."

The process of 1) may be performed in the following manner. At an instruction from the controller 5d of the service control station 5, the communicator 5c transmits a request for transmitting communications methods associated with presence information via the information transfer apparatus 3 to the communications apparatus 2. The output 2b of the communications apparatus 2 outputs the request. Based on the request, a user inputs presence information, the user's identification information, information specifying a plurality of communications methods and information necessary communications, using the input 2d.

The inputted information is transmitted via the controller 2e, communicator 2a and information transfer apparatus 3 to the controller 5d of the service control station 5. The controller 5d of the service control station 5 obtains the inputted information. The controller 5d then generates a communications method table based on the transmitted information. The controller 5d directs the store 5a to store the generated communications method table.

In this case, when the user forgets to "request that a plurality of communications methods be stored in the service control station 5," a request for transmitting the plurality of communications methods is transmitted to the user's communications apparatus 2. The plurality of communications methods associated with the user's presence information are thus reliably stored in the service control station 5.

The process of 1) may also be performed in the following manner. After the process steps S10 to S30, the controller 5d does not need to perform rewiring of the communications method table stored in the store 5a. The controller 5d may generate a new communications method table and direct the store 5a to store it.

The controller 5d manages presence information included in communications method tables stored in the store 5a for each user's identification number. When a registration request is transmitted from the communications apparatus 2 of a user, the controller 5d transmits presence information associated with the user's identification information to the communications apparatus 2 of the user.

When the current status of the user agrees with any situation included in the presence information, the user is required only to input the registration request and the user's identification information and presence information using the input 2d in S10.

The user's identification information and presence information are transmitted to the service control station 5. The controller 5d of the service control station 5 identifies the communications method table associated with the user's identification information and presence information as a communications method table associated with the current status of the user. The controller 5d provides the communications method table with information indicating that "it is the communications method table associated with the current status of the user."

To obtain the communications methods associated with the user's presence information, the controller 5d refers to the communications method table provided with the information indicating that "it is the communications method table associated with the current status of the user."

2) A process in which a user X obtains presence information about a user Y and communications methods associated with the presence information FIG. 8 is a sequence diagram illustrating a process in which, a user X obtains presence information about a user Y and communications methods associated with the presence information in the communications control system having the above-described configuration. After the process step of S40 in which the presence information about the user Y and the plurality of communications methods associated therewith are stored in the store 5a of the service control station 5, this process is conducted.

When the user X wants to communicate with the user Y, for example, this process allows the user X to know the current status of the user Y and communications methods desired by the user Y. In this case, the user X is the above-described "transmitting end user" and the user Y is the above-described "receiving end user".

In step S100, the user X inputs a request for presence information about the user Y and a request for communications methods associated therewith, using the input 2d of the communications apparatus 2. At this time, the user X inputs identification information of the user Y using the input 2d.

In step S110, the requests inputted by the user X are transmitted via the controller 2e and the communicator 2a of the communications apparatus 2 to the controller 3f of the information transfer apparatus 3. At this time, location information of the communications apparatus 2 of the user X, location information of the service control station 5 and the identification information of the user Y are transmitted to the controller 3f.

In step S120, the controller 3f of the information transfer apparatus 3 holds the location information of the communications apparatus 2 of the user X and the location information of the service control station 5. Then, based on the location information of the service control station 5, the controller 3f transmits the requests and the identification information of the user Y to the controller 5d of the service control station 5.

In step S130, the controller 5d of the service control station 5 accesses the store 5a and retrieves a communications methods table associated with the identification information of the user Y. Then, the controller 5d refers to the communications method table, and obtains presence information and a plurality of communications methods associated therewith.

In step S135, the controller 5d transmits the obtained presence information about the user Y and the plurality of communications methods via the communicator 5c to the information transfer apparatus 3.

In step S140, the controller 3f of the information transfer apparatus 3 transmits the presence information and the plurality of communications methods to the communications apparatus 2 based on the location information of the communications apparatus 2 of the user X.

In step S150, the controller 2e of the communications apparatus 2 directs the output 2b to output the presence information and the plurality of communications methods. The controller 2e also directs the store 2c to store the plurality of communications methods in association with the user Y and the presence information.

3) A process of implementing a given communications method desired by a "transmitting end user"

Figure 9:
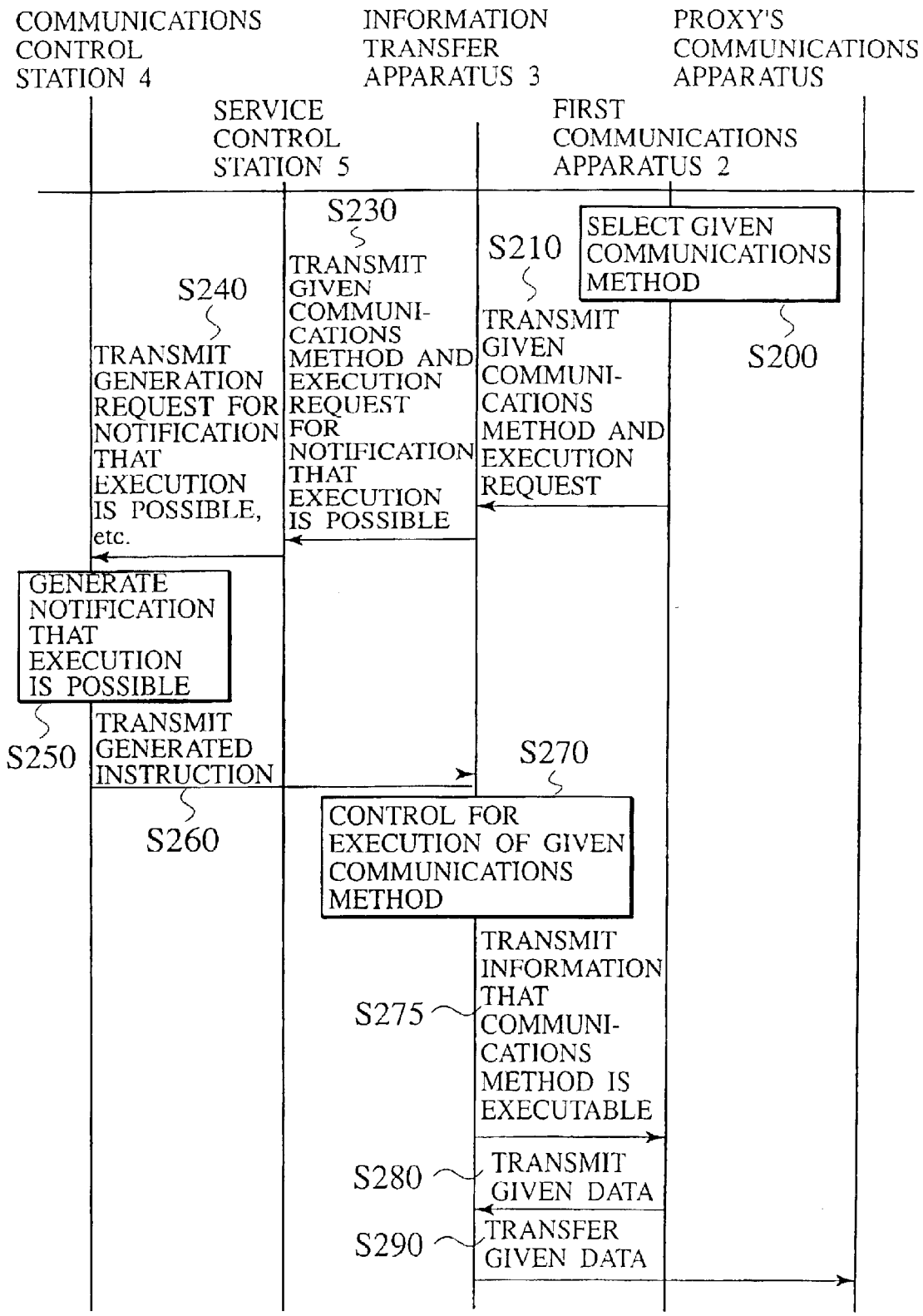
FIG. 9 is a sequence diagram illustrating the process of implementing a given communications method associated with the presence information in the embodiment 1.

This process will be described with a user X as a "transmitting end user" and a user Y as a "receiving end user". In this process, a plurality of communications methods associated with presence information (in meeting) of the user Y are the "communications method by transfer," "electronic mail communications method" and "communications method in answer mode." FIG. 9 is a sequence diagram for description of this process.

Through the above-described processes 1) and 2), the user X knows that the presence information about the user Y is "in meeting," for example. In the communications apparatus 2 of the user X, the output 2b has outputted the plurality of communications methods associated with the presence information (the "communications method by transfer," "electronic mail communications method" and "communications method in answer mode").

In step 200, the user X inputs, using the input 2d of its communications apparatus 2, a selected given communications method desired by the user X from among the plurality of communications methods outputted by the output 2b. Based on the selection, the controller 2e selects the given communications method desired by the user X from among the plurality of communications methods.

The user X is herein assumed to have input, using the input 2d, the selected "communications method by transfer." At this time, the user X inputs, using the input 2d, the identification information of the user Y and the location information of the communications apparatus 2 of the user Y. The user X inputs, using the input 2d, a request for executing the "communications method by transfer."

In step S210, the information entered by the user X is transmitted via the controller 2e to the controller 3f of the information transfer apparatus 3. At this time, the location information of the communications apparatus 2 of the user X is also transmitted to the controller 3f.

In step S230, based on the request for executing the "communications method by transfer", the controller 3f of the information transfer apparatus 3 transmits a request for generating a notification that execution is possible for the "communications method by transfer" to the controller 5d of the service control station 5. At this time, to the controller 5d, the identification information of the user Y and the location information of the communications apparatus 2 of the user Y are transmitted. The controller 3f holds the location information of the communications apparatus 2 of the user Y and the location information of the communications apparatus 2 of the user X.

In step S240, the controller 5d of the service control station 5 obtains the generation request for the executable instruction for the "communications method by transfer", the identification information of the user Y and the location information of the communications apparatus 2 of the user Y. The controller 5d retrieves a communications method table associated with the identification information of the user Y from the store 5a. Then, the controller 5d refers to the communications method table and obtains information necessary communications related to the "communications method by transfer." The controller 5d obtains, as the information necessary communications related to the "communications method by transfer," the location information of the communications apparatus 2 of a proxy, for example.

The controller 5d then transmits the request to generate the executable instruction for the "communications method by transfer" to the communications control station 4 via the communicator 5b. At this time, the location information of the proxy's communications apparatus 2, the identification information of the user Y and the location information of the communications apparatus 2 of the user Y are transmitted to the communications control station 4.

In step S250, for example, the generation request for the executable instruction for the "communications method by transfer" is transmitted via the receiver 4a to the instruction generator 4b. The instruction generator 4b generates the executable instruction for the "communications method by transfer" based on the generation request. This executable instruction includes the location information of the communications apparatus 2 of the user X, the location information of the communications apparatus 2 of the user Y, the location information of the communications apparatus 2 of the proxy and transfer instruction information. The transfer instruction information indicates instructing "transfer of data destined for the user Y from among data transmitted from the communications apparatus 2 of the user X to the communications apparatus 2 of the proxy." As described above, when the communications control station 4 is provided with a store for storing executable instructions and an instruction obtainer, the instruction obtainer obtains the executable instruction from the store.

Then, in step S260, the executable instruction is transmitted via the transmitter 4c to the communications controller 3d of the information transfer apparatus 3.

In step S270, the communications controller 3d decodes the executable instruction. The communications controller 3d then obtains the location information of the communications apparatus 2 of the user X, the location information of the communications apparatus 2 of the user Y, the location information of the communications apparatus of the proxy and the transfer instruction information.

Based on the location information of the communications apparatus 2 of the user X and the location information of the communications apparatus 2 of the user Y, the communications controller 3d finds data transmitted from the communications apparatus 2 of the user X to the communications apparatus 2 of the user Y from among data transmitted to the first communicator 3a. Then, based on the location information of the communications apparatus 2 of the proxy and the transfer instruction information, the communications controller 3d controls the first communicator 3a or the second communicator 3b to transfer the data to the communications apparatus 2 of the proxy.

The communications controller 3d holds the transfer instruction information, the location information of the communications apparatus 2 of the user X, the location information of the communications apparatus 2 of the user Y and the location information of the communications apparatus 2 of the proxy. Upon completion of the operation for controlling the communicators, the communications controller 3d transmits the fact to the controller 3f.

In step S275, the controller 3f of the information transfer apparatus 3 transmits to the communications apparatus 2 of the user X, the fact that the "communications method by transfer" is executable. The controller 2e of the communications apparatus 2 directs the output 2b to output the fact. Based on the fact, as outputted by the output 2b, the user X inputs given data using the input 2d.

In step S280, the controller 2e of the communications apparatus 2 transmits the given data inputted through the input 2d via the communicator 2a to the first communicator 3a of the information transfer apparatus 3. At this time, the location information of the communications apparatus 2 of the user X is transmitted to the first communicator 3a of the information transfer apparatus 3. Also the fact that "a destined apparatus of the given data is the communications apparatus 2 of the user Y" is transmitted to the first communicator 3a of the information transfer apparatus 3.

In step S290, the first communicator 3a of the information transfer apparatus 3 transmits to the communications controller 3d, the "location information of the user X" and the "fact that the destined apparatus of the given data is the communications apparatus 2 of the user Y". The communications controller 3d performs the following operation according to the transfer instruction information for the executable instruction. The communications controller 3d determines that the given data transmitted to the first communicator 3a is data transmitted from the communications apparatus 2 of the user X to the communications apparatus 2 of the user Y. The communications controller 3d then instructs the second communicator 3b, for example, to transfer the given data to the communications apparatus 2 of the proxy, based on the location information of the proxy's communications apparatus 2 and the transfer instruction information. The second communicator 3b transmits the given data to the proxy's communications apparatus 2, for example.

When the communications apparatuses 2 are telephone devices, for example, the communications controller 3d controls the first communicator 3a and the second communicator 3b such that a telecommunication line is established between the communications apparatus 2 of the user X and the communications apparatus of the proxy. When the communications apparatuses 2 are PC terminals, the communications controller 3d changes "destination information of packet data" from the "location information of the communications apparatus 2 of the user Y" to the "location information of the communications apparatus of the proxy", for example.

Next, the case where in step S200, the user X inputs the selected "communications method in answer mode" using the input 2d will be described as follows. The process of implementing the "communications method in answer mode" in the communications control system will be described as follows. The description is made with reference to FIG. 9. First, process steps S200 to S240 are performed.

Then, the instruction generator 4b generates a notification that execution is possible for the "communications method in answer mode" (S250). The executable instruction is then transmitted to the communications controller 3d of the information transfer apparatus 3 (S260).

In step S270, the communications controller 3d decodes the executable instruction. The communications controller 3d 30 obtains the location information of the communications apparatus 2 of the user X, the location information of the communications apparatus 2 of the user Y and given communications instruction information. The communications controller 3d controls the first communicator 3a and other units so that the "communications method in answer mode" can be implemented.

After the step S275, when a call signal destined for the user Y is transmitted from the communications apparatus 2 of the user X to the first communicator 3a in S280, the communications controller 3d performs the following operation. Based on the given communications instruction information, the communications controller 3d transmits a "request for transmitting a message" to the communications apparatus 2 of the user Y via the second communicator 3b. When a given message is transmitted from the communications apparatus 2 of the user Y to the controller 3f via the second communicator 3b, the communications controller 3d performs the following operation. The communications controller 3d instructs the controller 3f to transmit the given message to the communications apparatus 2 of the user X via the first communicator 3a. The given message is transmitted to the controller 2e of the communications apparatus 2 of the user X. At an instruction from the controller 2e, the output 2b outputs the given message.

When given data (a response message to the given message) is transmitted from the communications apparatus 2 of the user X to the information transfer apparatus 3, the information transfer apparatus 3 transmits the given data to the communications apparatus 2 of the user Y. In the communications apparatus 2 of the user Y, the given data is stored in the store 2c. When the user Y enters request for outputting the given data through the input 2d, the given message is outputted by the output 2b.

Next, description will be made as follows with the case where, in step S200, the user X inputs the selected "electronic mail communications method" using the input 2d. In the communications control system, the process of implementing the "electronic mail communications method" will be described as follows. The description will made with reference to FIG. 9.

First, the process steps S200 to S240 are performed. The instruction generator 4b generates a notification that execution is possible for the "electronic mail communications method" (S250). The executable instruction is transmitted to the communications controller 3d of the information transfer apparatus 3 (S260).

In step S270, the communications controller 3d decodes the executable instruction. The communications controller 3d obtains the location information of the communications apparatus 2 of the user X, the location information of the communications apparatus 2 of the user Y and given communications instruction information. The communications controller 3d controls the "first communicator 3a and other units" so that the "electronic mail communications method" can be implemented.

After the process step of S275, in S280, the following process is performed. When "data destined for the communications apparatus 2 of the user Y" transmitted from the communications apparatus 2 of the user X is electronic mail data, the communications controller 3d instructs the "first communicator 3a and other units" to transmit it to the communications apparatus 2 of the user Y. When "data destined for the communications apparatus 2 of the user Y" transmitted from the communications apparatus 2 of the user X is not electronic mail data, the communications controller 3d instructs the "first communicator 3a and other units" not to transmit the data to the communications apparatus 2 of the user Y.

Detailed description will be made as follows. When a telephone signal is transmitted from the communications apparatus 2 of the user X to the first communicator 3a, the communications controller 3d determines whether or not the destination telephone number of the telephone signal is a telephone number assigned to the communications apparatus 2 of the user Y. When the destination telephone number is determined to be the telephone number assigned to the communications apparatus 2 of the user Y, the communications controller 3d instructs the second communicator 3b not to transmit the telephone signal to the communications apparatus 2 of the user Y.

When electronic mail data is transmitted from the communications apparatus 2 of the user X to the first communicator 3a, the communications controller 3d determines whether or not the destination address of the data is an address assigned to the communications apparatus 2 of the user Y. When the destination address is determined to be the address assigned to the communications apparatus 2 of the user Y, the communications controller 3d instructs the second communicator 3b to transmit the electronic mail data to the communications apparatus 2 of the user Y.

The process of 3) also applies to the case where the given communications method is the "communications method using visual telephones."

(The Functions and Effects)

In this embodiment, the store 5a stores a plurality of communications methods specified by a "receiving end user" in association with presence information showing the current status of the "receiving end user".

The controller 2e selects a given communications method desired by a "transmitting end user" from among the plurality of communications methods associated with the presence information. Thus selection of the communications method is made with the "receiving end user" and the "transmitting end user" taken into consideration.

The instruction generator 4b generates a notification that execution is possible for a given communications method selected by the controller 2e. According to the generated executable instruction, the communications controller 3d controls the "first communicator 3a and other units" for communications between the first communications apparatus and the second communications apparatus 2. The information transfer apparatus 3 (communications method executing apparatus) can thus implement the given communications method for communications between the first communications apparatus 2 and the second communications apparatus 2. The communications control system of this embodiment thus can implement communications allowing for conveniences of both the "receiving end user" and the "transmitting end user".

(Modification 1 of the Embodiment 1)

A first modification of the above-described embodiment is as follows. Even when a request for presence information about a user Y and a request for a plurality of communications methods associated with the presence information are not transmitted from the communications apparatus 2 of a user X to the service control station 5, the service control station 5 conducts the following process.

The communicator 5c (provider) of the service control station 5 transmits (provides) the presence information and the plurality of communications methods associated therewith to the communications apparatus 2 of the user X. The controller 2e of the communications apparatus 2 of the user X selects a given communications method desired by the user from among the plurality of communications methods provided.

Detailed description will be made as follows. It is herein assumed that a request for presence information about the user Y and a request for a plurality of communications methods associated with the presence information are not transmitted from the communications apparatus 2 of the user X to the service control station 5.

Before step S200, the communications apparatus 2 of the user X transmits a communications start signal and identification information of the user Y to the communications apparatus 2 of the user Y. The communications start signal and the identification information of the user Y are transmitted via the information transfer apparatus 3 to the controller 5d of the service control station 5.

The controller 5d of the service control station 5 reads a communications method table associated with the identification information of the user Y from the store 5a. The controller 5d then refers to the communications method table and obtains the presence information about the user Y and the plurality of communications methods associated with the presence information.

The controller 5d of the service control station 5 transmits the information (the presence information and the plurality of communications methods associated with the presence information) to the communications apparatus 2 of the user X via the communicator 5c and the information transfer apparatus 3. The output 2b of the communications apparatus 2 of the user X outputs the presence information and the plurality of communications methods associated with the presence information. Then the process step of S200 may be performed.

According to this modification, when the "transmitting end user" X forgets to request for the plurality of communications methods associated with the presence information, the plurality of communications methods associated with the presence information are transmitted to the communications apparatus 2 of the user X. The user X can thus securely obtain a plurality of communications methods associated with presence information about the user Y.

(Modification 2 of the Embodiment 1)

A second modification of the above-described embodiment is as follows. A "receiving end user" may have an in-house meeting or may have a meeting in a client's office, for example. Such situations are included in the same presence information (currently in meeting), and the "receiving end user" may want to change the communications methods associated with the presence information according to his geographic place.

In this context, a communications control system of the modification 2 allows the "receiving end user" to specify a plurality of communications methods associated with presence information and geographic place information (hereinafter geographic place information is referred to as place information). In the system of modification 2, the communications apparatus 2 of a user is provided with a detector (not shown) for detecting place information showing the geographic place where the communications apparatus 2 of the user is.

The detector transmits a place information signal to the communicator 5c of the service control station 5 via the communicator 2a. The controller 5d of the service control station 5 obtains the place information of users.

In a communications method table according to the modification 2, identification information of a user, presence information, place information, communications methods and information necessary communications are associated with one another. FIGS. 10A and 10B are diagrams illustrating examples of the communications method table of this modification. As shown in FIGS. 10A and 10B, the two communications method tables have the same presence information but different place information. The two communications method tables have different communications methods associated with the presence information.

(Communications Control Method)

In step S10 shown in the embodiment 1, the user inputs, using the input 2d, information identifying the user, presence information, communications methods and information necessary communications in mutual associations. The detector detects place information showing the place where the communications apparatus 2 of the user is. The place information is transmitted to the controller 2e.

The controller 2e transmits the inputted information via the information transfer apparatus 3 to the controller 5d of the service control station 5. The controller 2e also transmits the place information via the communicator 2a to the communicator 5c of the service control station 5. To the controller 5d of the service control station 5, the information identifying the user, presence information, place information, communications methods and information necessary communications are transmitted. In step S40, the controller 5d generates a communications method table in which the identification information of the user, presence information, place information, communications methods and information necessary communications are associated with one another. The controller 5d directs the store 5a to store the generated communications method table. Processes identical to the processes of 2) and 3) in the embodiment 1 are performed.

In step S10 in 1), the user may inputs, using the input 2d, information identifying the user, presence information, place information, communications methods and information necessary communications in mutual associations. In step S40, the controller 5d generates a communications method table in which the identification information of the user, presence information, place information, communications methods and information necessary communications are associated with one another. The controller 5d may direct the store to store the generated communications method table.

In this case, the store 5a stores a plurality of communications method tables associated with identification information of a user. The user inputs the current status and the identification information of the user using the input 2d. The input information is transmitted to the controller 5d of the service control station 5. The detector of the communications apparatus 2 of the user transmits the detected place information to the service control station 5.

The controller 5d of the service control station 5 accesses the store 5a. The controller 5d obtains a communications method table associated with the place information and the current status from among the plurality of communications method tables associated with the identification information of the user.

After the process steps of S100 to S120, the following process is performed. The controller 5d of the service control station 5 may refer to the communications method table and obtains presence information and a plurality of communications methods associated therewith and information necessary communications. The subsequent process is the same as that in the embodiment 1.

In the modification 2, the "receiving end user" can specify a plurality of communications methods associated with presence information and place information. The communications control system of this modification thus can implement communications further allowing for conveniences of both the "transmitting end user" and the "receiving end user".

Embodiment 2

(The Configuration of a Communications Control System)

A communications control system in embodiment 2 is different from the communications control system in embodiment 1 in the configuration of the service control station 5 and the functions of the information transfer apparatus 3. In this embodiment, components identical to those of the system in the embodiment 1 are attached the same reference numerals and will not be described.

FIG. 11 is a diagram illustrating the configuration of a service control station 5 in the embodiment 2. The service control station 5 in the embodiment 2 does not include a communicator 5b for conducting data communications with a communications control station 4. A controller 3f of an information transfer apparatus 3 transmits a generation request for a notification that execution is possible for a given communications method to the communications control station 4.

(Communications Control Method)

In this embodiment, processes identical to those shown in the embodiment 1 are not described. First, the processes of 1) and 2) shown in the embodiment 1 are performed.

The process of 3) shown in the embodiment 1 is performed as follows. The process is described with a user X as a "transmitting end user" and a user Y as a "receiving end user". Through the above-described processes 1) and 2), the user X knows that the presence information about the user Y is "in meeting," for example. In a communications apparatus 2 of the user X, an output 2b outputs a plurality of communications methods (a "communications method by transfer," an "electronic mail communications method," and a "communications method in answer mode") associated with the presence information.

Figure 12:
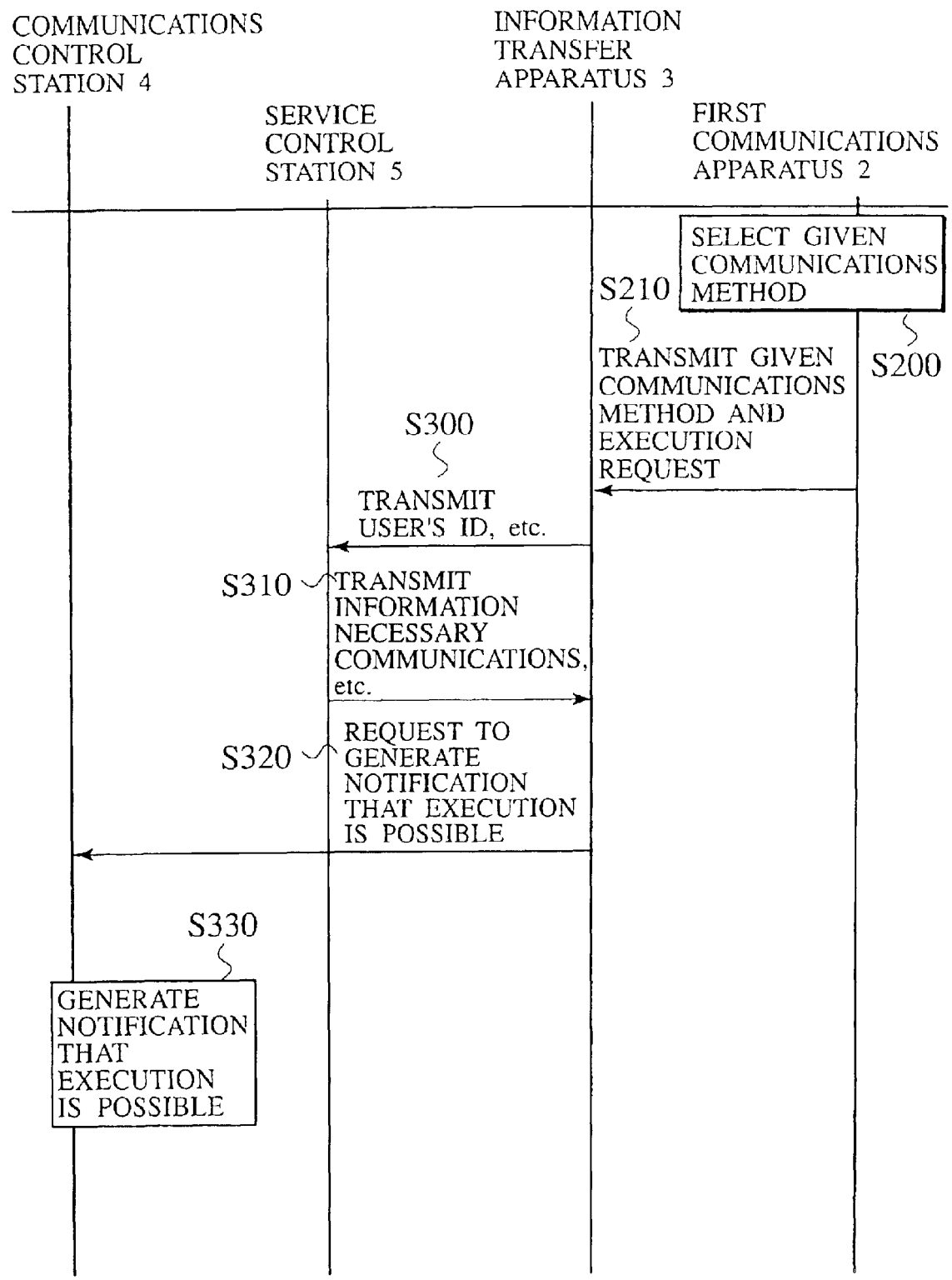
FIG. 12 is a sequence diagram illustrating the process of implementing a given communications method associated with presence information in the embodiment 2.
Figure 13:
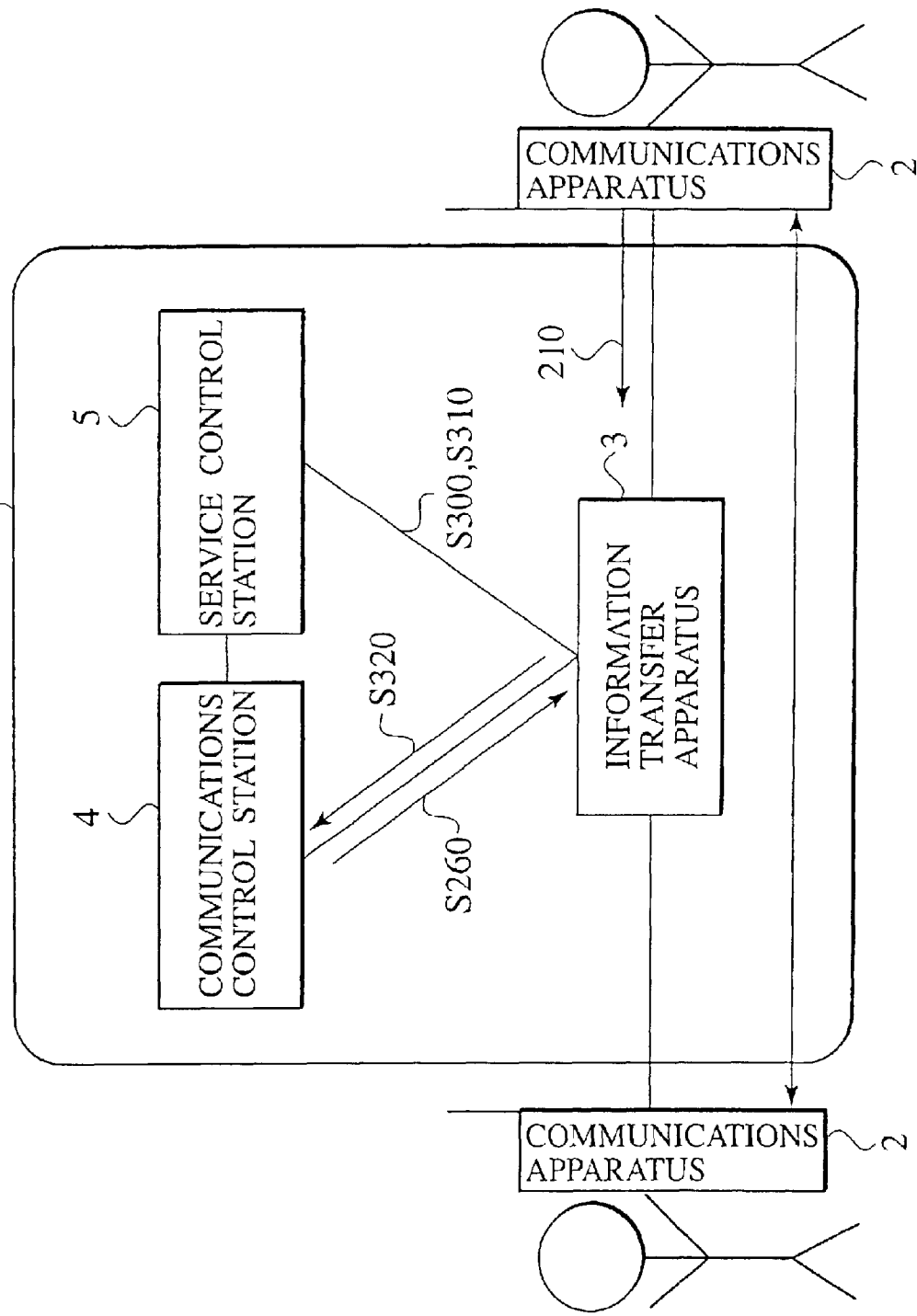
FIG. 13 is a complementary diagram illustrating the process of implementing the given communications method associated with the presence information in the embodiment 2.

FIG. 12 is a sequence diagram illustrating a process in which a given communications method desired by the user X is implemented. In FIG. 12, steps identical to those shown in FIG. 9 are attached the same reference numerals and will not be described. FIG. 13 is a diagram for complementing the description of the sequence diagram in FIG. 12.

First, the process steps S200 and S210 are performed. The user X is herein assumed to input the selected "communications method by transfer," using the input 2d. Then, in step S300, the controller 3f of the information transfer apparatus 3 transmits identification information of the user Y and information specifying the "communications method by transfer" to a controller 5d of the service control station 5 via a third communicator 3c.

In step S310, the controller 5d of the service control station 5 reads a communications method table associated with the identification information of the user Y from a store 5a. The controller 5d refers to the communications method table and obtains information necessary communications for the "communications method by transfer" (e.g., location information of a proxy's communications apparatus 2). The controller 5d associates the information necessary communications with the "communications method by transfer" for transmission to the controller 3f of the information transfer apparatus 3.

In step S320, the controller 3f of the communications transfer apparatus 3 transmits a generation request for a notification that execution is possible for the "communications method by transfer" to the communications control station 4. At this time, to the communications control station 4, the identification information of the user Y, the location information of the communications apparatus 2 of the user Y and the information necessary communications are transmitted.

In step S330, the information including the generation request for the executable instruction for the "communications method by transfer" is transmitted via a receiver 4a to an instruction generator 4b. The instruction generator 4b generates the executable instruction for the "communications method by transfer" based on the generation request. The subsequent process steps are identical to those in and after step S260 shown in FIG. 9. This embodiment also provides the same effects as those in the embodiment 1.

Embodiment 3

(The Configuration of a Communications Control System)

A communications control system in embodiment 3 is different from the communications control system in the embodiment 1 in the configuration of the service control station 5 and the configuration of the communications control station 4. In this embodiment, components identical to those of the system in the embodiment 1 are attached the same reference numerals and will not be described.

Figure 14:
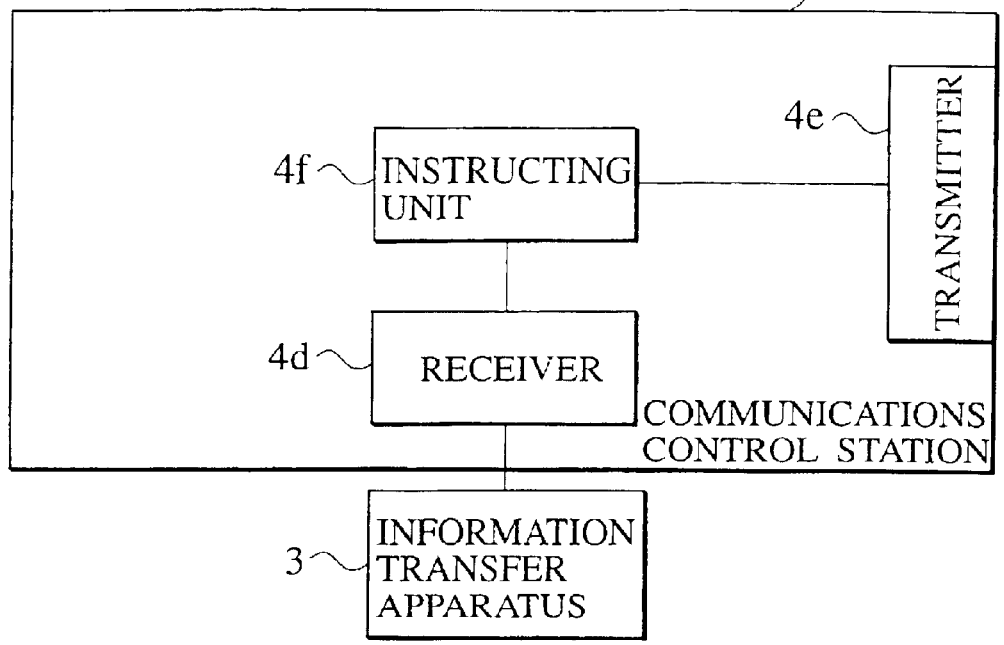
FIG. 14 is a diagram illustrating the configuration of a communications control station in embodiment 3.

FIG. 14 is a diagram illustrating the configuration of a communications control station 4 in the embodiment 3. The communications control station 4 in the embodiment 3 includes an instructing unit 4f instead of the instruction generator 4b.

The function of the instructing unit 4f is as follows. A receiver 4d receives a request to generate a notification that execution is possible for a given communications method. The request is transmitted to the instructing unit 4f. The instructing unit 4f instructs a transmitter 4e to transmit the generation request for the executable instruction for the given communications method to the service control station 5. At this time, the instructing unit 4f transmits the generation request for the executable instruction for the given communications method to the transmitter 4e. The transmitter 4e transmits the generation request to a service control station (a given device) including the instruction generator 4b.

Figure 15:
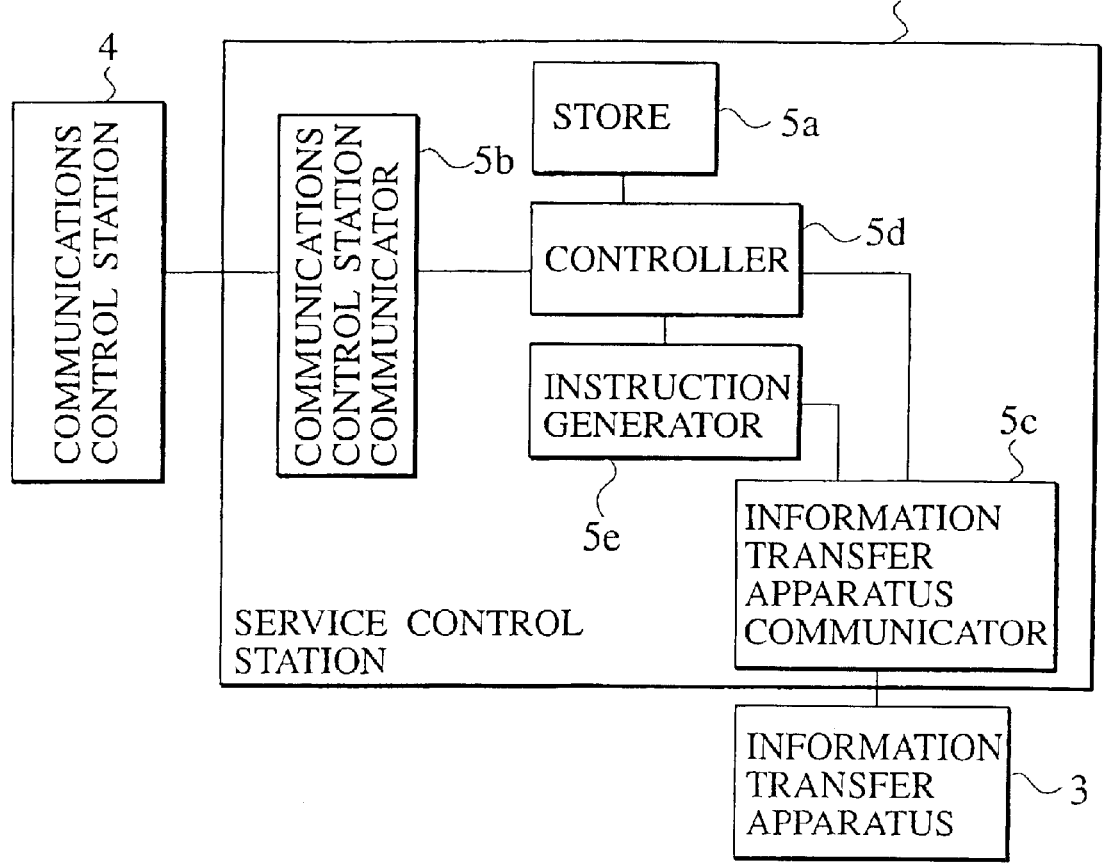
FIG. 15 is a diagram illustrating the configuration of a service control station in the embodiment 3.

FIG. 15 is a diagram illustrating the configuration of the service control station 5 in the embodiment 3. The service control station 5 in the embodiment 3 includes an instruction generator 5e. The instruction generator 5e has a function of the instruction generator 4b of the communications control station 4 shown in the embodiment 1. The instruction generator 5e can generate executable instructions for all the communications methods.

When a communicator 5b receives a generation request for a notification that execution is possible for a given communications method, the generation request is transmitted to the instruction generator 5e. The instruction generator 5e generates the executable instruction for the given communications method and transmits the executable instruction to a communicator 5c. The communicator 5c transmits the executable instruction generated by the instruction generator 5e to an information transfer apparatus 3 which executes the given communications method.

(Communications Control Method)

In this embodiment, process steps identical to those shown in the embodiment 1 will not be described. First, the processes of 1) and 2) shown in the embodiment 1 are performed.

The process of 3) shown in the embodiment 1 is performed as follows. This process will be described with a user X as an "transmitting end user" and a user Y as a "receiving end user".

Through the above-described processes 1) and 2), the user X knows that presence information about the user Y is "in meeting," for example. In a communications apparatus 2 of the user X, an output 2b has outputted a plurality of communications methods (a "communications method by transfer," an "electronic mail communications method," and a "communications method in answer mode") associated with the presence information.

Figure 16:
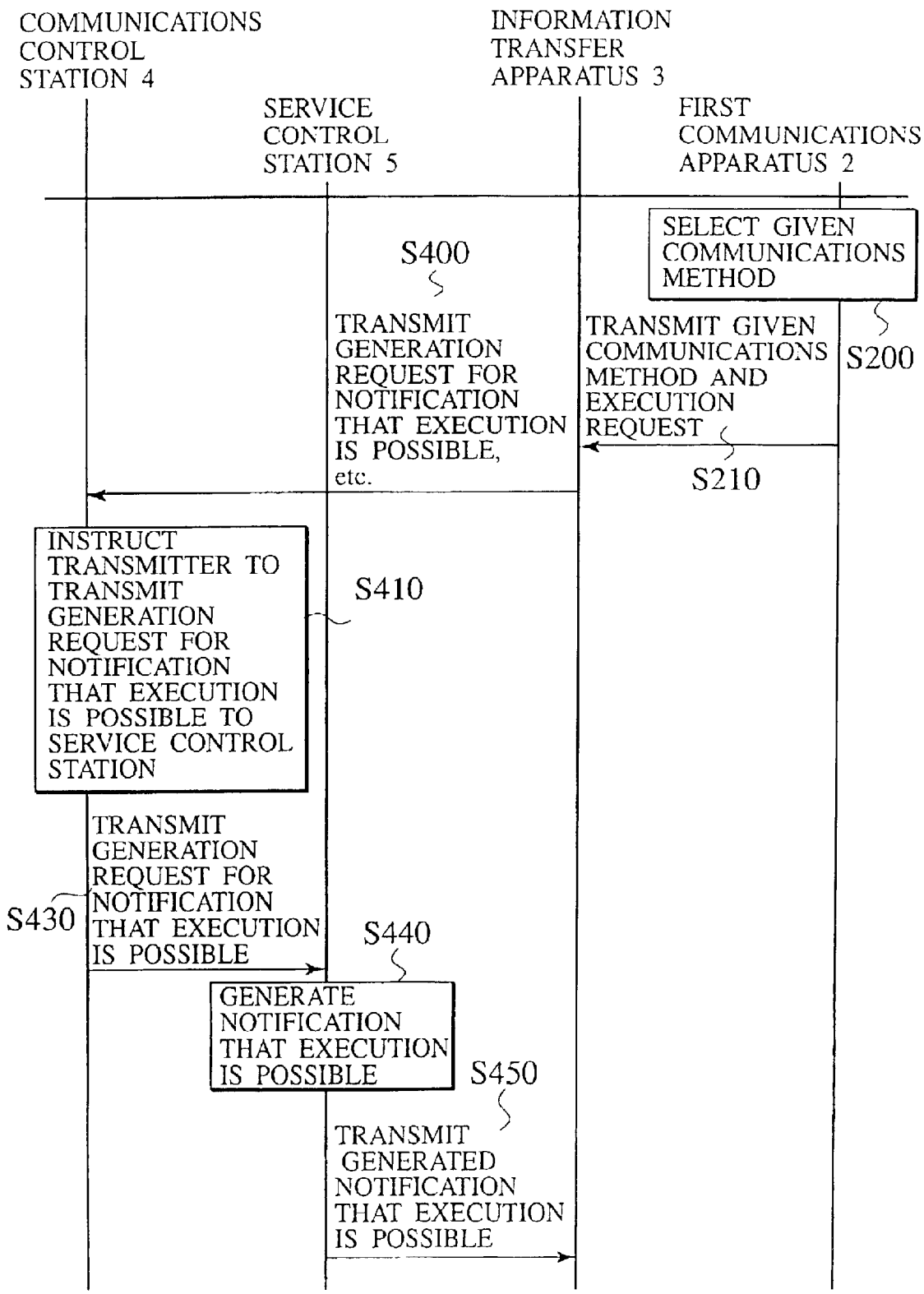
FIG. 16 is a sequence diagram illustrating the process of implementing a given communications method associated with presence information in the embodiment 3.

FIG. 16 is a sequence diagram illustrating a process in which a given communications method desired by the user X is implemented. In FIG. 16, process steps identical to those shown in FIG. 9 are attached the same reference numerals and will not be described. FIG. 17 is a diagram for complementing the description of the sequence diagram in FIG. 16.

First, process steps S200 and S210 are performed. The user X is herein assumed to input the selected "communications method by transfer," using the input 2d.

In step S400, a controller 3f of the information transfer apparatus 3 transmits a generation request for a notification that execution is possible for the "communications method by transfer" to the communications control station 4 via a third communicator 3c based on a request to implement the "communications method by transfer." At this time, to the communications control station 4, the identification information of the user Y and the location information of the communications apparatus 2 of the user Y are transmitted.

In step S410, the request is transmitted to the instructing unit 4f. The instructing unit 4f instructs the transmitter 4e to transmit the generation request for the executable instruction for the "communications method by transfer" to the service control station 5. At this time, the instructing unit 4f transmits the generation request for the executable instruction for the given communications method to the transmitter 4e.

In step S430, the transmitter 4e transmits the generation request to the service control station 5 including the instruction generator 5e. At this time, the identification information of the user Y and the location information of the communications apparatus 2 of the user Y are transmitted to the service control station 5.

In step S440, the controller 5d of the service control station 5 obtains a communications method table associated with the identification information of the user Y from a store 5a. The controller 5d refers to the communications method table and obtains information necessary communications associated with the "communications method by transfer" (e.g., location information of a communications apparatus 2 of a proxy). The controller 5d transmits to the instruction generator 5e, the generation request for the executable instruction for the "communications method by transfer"

and the information necessary communications. At this time, to the instruction generator 5e, the identification information of the user Y and the location information of the communications apparatus 2 of the user Y are transmitted. The instruction generator 4b generates the executable instruction for the "communications method by transfer" based on the generation request.

In step S450, the executable instruction is transmitted via the communicator 5c to a communications controller 3d of the information transfer apparatus 3. The subsequent process steps are the same as the process steps S270 to S290.

This embodiment also provides the same effects as those in embodiment 1.

The communications control system in the embodiment 3 may further include a plurality of communications devices. Each of the communications devices have an instruction generator. The instruction generator 5e of the service control station 5 generates a notification that execution is possible for a single communications method. Identically, Each of the communications devices generate a notification that execution is possible for a single communications method. The instruction generators of the respective devices generate different executable instructions.

The instructing unit 4f holds an instruction correspondence table in which communications method and the location information of device (such as the service control station 5 or communications device) are associated with one another.

When a request for generating a notification that execution is possible for a given communications method is transmitted from the receiver 4d to the instructing unit 4f, the instructing unit 4f refers to the instruction correspondence table and determines the device associated with the given communications method. At an instruction of the instructing unit 4f, the transmitter 4e transmits to the determined device the generation request for the executable instruction for the given communications method.

In this case, the function of generating executable instructions for the respective communications methods is shared by each device. The instructing unit 4f transmits generation request for executable instructions for each communications method, to the device associated with each communications method. This eliminates the need for the instruction generator 5e of the service control station 5 to generate executable instructions for all the communications methods, reducing the process burden of the service control station 5.

The embodiment 2 and embodiment 3 may be modified like the modification 1 of the embodiment 1 and the modification 2 of the embodiment 1. A manager of a communications system may apply any of the embodiments 1 to 3 to the communications system based on the situation of the communications network.

(Modification 1 of the Embodiments 1, 2 and 3)

In the embodiments 1, 2 and 3, the "receiving end user" Y can input a registration request using the input 2d of the communications apparatus 2. At this time, the user Y can input identification information of at least one user (a specified user) using the input 2d. To the communications apparatus 2 of the at least one user, presence information about the user Y and a plurality of communications methods associated therewith are provided, as necessary. To the communications apparatuses 2 of users other than the at least one user, the presence information about the user Y and the plurality of communications methods associated therewith are not provided.

A communications method table associated with the identification information of the user Y includes the identification information of the at least one user. When the communicator 5 of the service control station 5 receives a request for the presence information about the user Y ("receiving end user") and a request for the associated plurality of communications methods from a user Z ("transmitting end user"), the controller 5d of the service control station 5 performs the following process.

The controller 5d reads the communications method table associated with the identification information of the user Y from the store 5a. The controller 5d determines whether or not the identification information of the user Z is present in the identification information of the at least one user (specified user) in the communications method table.

When the controller 5d determines the presence of the identification information of the user Z, the following process is performed. That is, at an instruction of the controller 5d, the communicator (provider) 5c transmits the presence information about the user Y and the associated plurality of communications methods, to the communications apparatus 2 of the user Z (specified user).

The user Z inputs, using the input 2d of its communications apparatus 2, a selected given communications method desired by the user Z from among the plurality of communications methods outputted by the output 2b. Based on the selection, the controller 2e selects the given communications method desired by the user Z from among the plurality of communications methods.

When the controller 5d determines the absence of the identification information of the user Z, the following process is performed. That is, the controller 5d instructs the communicator 5c not to transmit the presence information about the user Y and the associated plurality of communications methods to the communications apparatus 2 of the user Z (specified user).

When determining the presence of the identification information of the user Z in the identification information of the at least one user in the communications method table, the controller 2e may perform the following process. The controller 2e may transmit an "instruction to transmit proof information for proving the identity of the user Z", to the communications apparatus 2 of the user Z. When the controller 2e obtains the proof information, the controller 2e may transmit the presence information about the user Y and the associated plurality of communications methods to the communications apparatus 2 of the user Z.

According to this modification, the presence information about the "receiving end user" Y and the associated plurality of communications methods are provided only to the communications apparatus 2 of a user specified by the "receiving end user" Y (e.g., a person having a close relationship with the user Y). This prevents a malignant third person from ill-using the presence information about the "receiving end user" Y and the associated plurality of communications methods.

(Modification 2 of the Embodiments 1, 2 and 3)

A communications system capable of providing the presence service currently uses an Internet network, for example. The communications system includes a server apparatus for holding presence information. The server apparatus provides the presence information to the communications apparatuses 2. In the communications system, data transmitted and received between the communications apparatuses is text data and/or image data, for example.

The communications system does not allow a user to specify a communications control method. The application of the embodiments 1, 2 or 3 to the communications system allows a user to specify a communications control method.

The communications system using the Internet network may include a given server apparatus. The given server apparatus holds communications executable protocol information for executing communications methods. The communications executable protocol information is transmitted to the communications controller 3d. The communications controller 3d uses the "communications executable protocol information" for executing a given communications method to execute the given communications method for communications between communications apparatuses.

In a communications system using the Internet with the communications apparatuses 2 fixed, a person using the communication apparatus 2 may be a malignant third person. For this reason, the communications system does not provide details of presence information about users to the communications apparatuses 2.

In a communications system using a wireless Internet network such as a wireless LAN, users of the communications apparatus 2 are highly likely to keep their own communications apparatus 2 as in a mobile communications system. In the communications system, a given device can thus hold details of presence information about users. The communications system thus allows the given device to provide details of presence information about the users to the communications apparatuses 2.

As a result, in the communications system of the above embodiments, when the communications network 1 is a wireless Internet network, the store 5a of the service control station 5 can store detailed presence information and a plurality of communications methods associated therewith. At a request from a communications apparatus 2, the service control station 5 can provide detailed presence information and a plurality of communications methods associated therewith to the communications apparatus 2.

The communications control system may include an agent device. The agent device holds location information of the communications apparatus 2 of a specified user (e.g., a family member or a friend of the user Y) who is a user previously specified by a "receiving end user" (e.g., user Y). The agent device has a function of the store 5a of the service control station 5. The agent device moves within the communications network 1 at specified time. The agent device can transmit presence information about the "receiving end user" and the associated plurality of communications methods to the communications apparatus 2 of the specified user.

The agent device moves within the network 1 at specified time. The agent device may transmit a request for transmitting presence information and a request for transmitting a plurality of communications methods associated with the presence information to the communications apparatus 2 of a "receiving end user" (e.g., user Y).

The communications control system including the agent device can provide only a user specified by a "receiving end user" with presence information about the "receiving end user" and the associated communications methods. Even when a "receiving end user" forgets to "request to store a plurality of communications methods associated with presence information in the agent device," the following process is performed. That is, to the communications apparatus 2 of the "receiving end user", a request for transmitting communications methods associated with presence information is transmitted. The communications methods associated with the presence information about the "receiving end user" are thus reliably stored in the agent device.

Various modifications will become possible for those skilled in the art after receiving the teachings of the present disclosure without departing from the scope thereof.

What is claimed is:

1. A communications control system for controlling communications conducted between a first communications apparatus for transmitting data and a second communications apparatus for receiving said data; said communications control system comprising:

a storage for storing a plurality of communications methods specified by a second user which is a user of said second communications apparatus in association with presence information showing the current status of said second user;

a selector provided at said first communications apparatus for selecting a given communications method desired by a first user which is a user of said first communications apparatus from among said plurality of communications methods associated with said presence information; and a communications method executor for executing said given communications method for communications between said first communications apparatus and said second communications apparatus, according to a notification that execution is possible for said given communications method selected by said selector.

2. A communications control system as set forth in claim 1, further comprising:

an instruction generator for generating said executable instruction for said given communications method;

wherein said communications method executor executes said given communications method for communications between said first communications apparatus and said second communications apparatus, according to said executable instruction generated by said instruction generator.

3. A communications control system as set forth in claim 2, further comprising:

a transmitter for transmitting a generation request for said executable instruction to a given device at which said instruction generator is provided;

wherein said instruction generator provided at said given device generates said executable instruction based on said generation request transmitted from said transmitter.

4. A communications control system as set forth in claim 1, further comprising:

a provider for providing said plurality of communications methods associated with said presence information to said first communications apparatus;

wherein said selector selects a given communications method desired by said first user from among said plurality of communications methods provided by said provider.

5. A communications control system as set forth in claim 1, further comprising:

a first input provided at said first communications apparatus for said first user to input a request for said communications methods associated with said presence information; and a provider for providing said first communications apparatus with said plurality of communications methods associated with said presence information based on said request inputted through said first input;

wherein said selector selects a given communications method desired by said first user from among said plurality of communications methods provided by said provider.

6. A communications control system as set forth in claim 1, further comprising:
- a second input provided at said second communications apparatus for said second user to input a request for storing said plurality of communications methods associated with said presence information in said storage and said plurality of communications methods;
- wherein said storage stores said plurality of communications methods inputted through said second input.

7. A communications control system as set forth in claim 1, further comprising:
- a transmitter for transmitting a request for transmitting said communications methods associated with said presence information, to said second communications apparatus;
- a second input for said second user to input said plurality of communications methods associated with said presence information; and
- an obtainer for obtaining said plurality of communications methods inputted through said second input from said second communications apparatus;
- wherein said storage stores said plurality of communications methods obtained by said obtainer.

8. A communications control system as set forth in claim 1, further comprising:
- a provider for providing said first communications apparatus of a specified user which is said first user specified by said second user, with said plurality of communications methods associated with said presence information;
- wherein said selector selects a given communications method desired by said specified user from among said plurality of communications methods associated with said presence information.

9. A communications control method for controlling communications conducted between a first communications apparatus for transmitting data and a second communications apparatus for receiving said data, said communication control method comprising the steps of:
- storing, in a storage, a plurality of communications methods specified by a second user which is a user of said second communications apparatus, in association with presence information showing the current status of said second user;
- having said first communications apparatus select a given communications method desired by a first user which is a user of said first communications apparatus, from among said plurality of communications methods associated with said presence information; and
- executing said given communications method for communications between said first communications apparatus and said second communications apparatus, according to a notification that execution is possible for said selected given communications method.

10. A communications control method as set forth in claim 9, further comprising the steps of:
- generating said executable instruction for said given communications method; and
- executing said given communications method for communications between said first communications apparatus and said second communications apparatus, according to said executable instruction generated by the generating step.

11. A communications control method as set forth in claim 10, further comprising the steps of:
- transmitting a generation request for said executable instruction to a given device generating said executable instruction for said given communications method; and
- having said given device generate said executable instruction based on said generation request transmitted by the transmitting step.

12. A communications control method as set forth in claim 9, further comprising the step of:
- providing said plurality of communications methods associated with said presence information to said first communications apparatus; and
- having said first communications apparatus select said given communications method desired by said first user from among said plurality of communications methods provided by the providing step.

13. A communications control method as set forth in claim 9, further comprising the steps of:
- having said first user input a request for said communications methods associated with said presence information;
- providing said first communications apparatus with said plurality of communications methods associated with said presence information based on said inputted request; and
- having said first communications apparatus select a given communications method desired by said first user from among said plurality of communications methods provided by the providing step.

14. A communications control method as set forth in claim 9, further comprising the steps of:
- having said second user input a request for storing said plurality of communications methods associated with said presence information in said storage and said plurality of communications methods; and
- storing said plurality of communications methods inputted in said storage.

15. A communications control method as set forth in claim 9, further comprising the steps of:
- transmitting a request for transmitting said communications methods associated with said presence information, to said second communications apparatus;
- having said second user input said plurality of communications methods associated with said presence information;
- obtaining said plurality of communications methods inputted; and
- storing said plurality of communications methods obtained in said storage.

16. A communications control method as set forth in claim 9, further comprising the steps of:
- providing said plurality of communications methods associated with said presence information, to said first communications apparatus of a specified user which is said first user specified by said second user; and
- having said first communications apparatus select a given communications method desired by said specified user from among said plurality of communications methods associated with said presence information.

17. A service control station for conducting communications with a first communications apparatus for transmitting data and a second communications apparatus for receiving said data, said service control station comprising:
- a storage for storing a plurality of communications methods specified by a user of said second communications apparatus, in association with presence information showing the current status of said user;

a receiver for receiving a request for said plurality of communications methods associated with said presence information, from said first communications apparatus; and a first transmitter for transmitting said plurality of communications methods to said first communications apparatus.

18. A service control station for conducting communications with a first communications apparatus for transmitting data and a second communications apparatus for receiving said data, said service control station comprising:

a storage for storing a plurality of communications methods specified by a user of said second communications apparatus in association with presence information showing the current status of said user; and a provider for providing said first communications apparatus with said plurality of communications methods associated with said presence information.

19. A service control station as set forth in claim 17, further comprising:

a second transmitter for transmitting a request for transmitting said communications methods associated with said presence information, to said second communications apparatus;

in the case that said receiver receives said plurality of communications methods associated with said presence information transmitted from said second communications apparatus, wherein said storage stores said plurality of communications methods received by said receiver.

20. A service control station as set forth in claim 17, wherein:

said receiver receives a request for generating a notification that execution is possible for a given communications method desired by a user of said first communications apparatus; and said first transmitter transmits a generation request for said executable instruction, to a communications control station generating said executable instruction.

21. A service control station as set forth in claim 17, further comprising:

an instruction generator for generating a notification that execution is possible for a given communications method desired by a user of said first communications apparatus;

in the case that said receiver receives a generation request for said executable instruction, wherein said first transmitter transmits said executable instruction generated by said instruction generator, to an information transfer apparatus executing said given communications method.

22. A service control station for conducting communications with a first communications apparatus for transmitting data and a second communications apparatus for receiving said data, said service control station comprising:

a storage for storing a plurality of communications methods specified by a user of said second communications apparatus, in association with presence information showing the current status of said user; and a provider for providing said plurality of communications methods associated with said presence information, to said first communications apparatus of a user specified by said user of said second communications apparatus.

23. A communications control station for conducting communications with a first communications apparatus for transmitting data and a second communications apparatus for receiving said data, said communications control station comprising:

an instruction generator for generating a notification that execution is possible for a given communications methods associated with presence information showing the current status of a user of said second communications apparatus;

a receiver for receiving a generation request for said executable instruction; and a transmitter for transmitting said executable instruction generated by said instruction generator to an information transfer apparatus executing said given communications method when said receiver receives said generation request for said executable instruction.

24. A communications control station for conducting communications with a first communications apparatus for transmitting data and a second communications apparatus for receiving said data, said communications control station comprising:

a receiver for receiving a request for generating a notification that execution is possible for a given communications method associated with presence information showing the current status of a user of said second communications apparatus; and a transmitter for transmitting a generation request for said executable instruction to a service control station generating said executable instruction when said receiver receives said request.

* * * * *